(12) United States Patent
Ishikawa et al.

(10) Patent No.: US 6,710,974 B2
(45) Date of Patent: Mar. 23, 2004

(54) TAPE CASSETTE OF HIGH TRANSPARENCY MATERIAL

(75) Inventors: Shigeru Ishikawa, Kanagawa-ken (JP); Hiroyuki Umeda, Kanagawa-ken (JP); Hisashige Fujiwara, Kanagawa-ken (JP); Yasufumi Hashimoto, Ibaraki-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 10/411,124

(22) Filed: Apr. 11, 2003

(65) Prior Publication Data

US 2003/0202279 A1 Oct. 30, 2003

Related U.S. Application Data

(63) Continuation of application No. 09/588,372, filed on Jun. 7, 2000, now Pat. No. 6,587,306.

(30) Foreign Application Priority Data

| Jun. 10, 1999 | (JP) | P11-164164 |
| Jun. 18, 1999 | (JP) | P11-173258 |
| Nov. 1, 1999 | (JP) | P11-311298 |
| Nov. 29, 1999 | (JP) | P11-338396 |

(51) Int. Cl.[7] .............................. G11B 23/02; G11B 5/78
(52) U.S. Cl. ...................................... 360/132; 360/134
(58) Field of Search .............................. 360/132, 131, 360/134, 272; 369/272; 242/344, 347

(56) References Cited

U.S. PATENT DOCUMENTS

| 4,901,171 A | | 2/1990 | Urayama et al. ........... 360/74.6 |
| 4,989,111 A | * | 1/1991 | Sato ........................... 242/344 |
| 5,024,394 A | * | 6/1991 | Ozawa et al. ............... 242/335 |
| 5,121,275 A | * | 6/1992 | Komiyama ................. 360/132 |
| 5,390,063 A | * | 2/1995 | Berg et al. .................. 360/132 |
| 2002/0034047 A1 | * | 3/2002 | Imamura et al. ........... 360/132 |

FOREIGN PATENT DOCUMENTS

| DE | 3510874 A1 | * | 10/1986 |
| EP | 0137929 A1 | * | 4/1985 |
| EP | 0163887 A1 | * | 12/1985 |
| EP | 0286355 A1 | * | 10/1988 |
| EP | 0359214 A2 | * | 3/1990 |
| EP | 0384739 A2 | * | 8/1990 |
| EP | 0397528 A2 | * | 11/1990 |
| GB | 2061226 A | * | 5/1981 |
| GB | 2119751 A | * | 11/1983 |
| JP | 11-144431 A | * | 5/1999 |
| WO | WO 97/04455 | * | 2/1997 |

* cited by examiner

*Primary Examiner*—Julie Anne Watko
(74) *Attorney, Agent, or Firm*—Nath & Associates PLLC; Marvin C. Berkowitz

(57) ABSTRACT

A tape cassette has a cassette case with top face, under face, front face, rear face, and a pair of right and left side face portions. A pair of supply and take-up tape containers sides is provided in the cassette case. A tape is wound around a pair of reels and contained in the pair of tape containers. A first wall portion connects the rear and right side face portion with each other and forms part of the take-up side tape container. A second wall portion connects the rear and left side face portion with each other and forms part of the supply side tape container. A first prism portion extends from the rear face portion to the right side face portion and refracts or reflects light from a light emission element of a recording and reproducing apparatus for detecting presence and absence of the tape cassette.

6 Claims, 29 Drawing Sheets

FIG.18

LIST OF EVALUATION RESULTS

|  | SAMPLE A | SAMPLE B | SAMPLE C | SAMPLE D |
|---|---|---|---|---|
| FIRST EMBODIMENT | ○ | ○ | ○ | ○ |
| SECOND EMBODIMENT | ○ | ○ | ○ | ○ |
| COMPARISON EXAMPLE 1 | × | × | ○ | ○ |
| COMPARISON EXAMPLE 2 | × | × | ○ | ○ |
| COMPARISON EXAMPLE 3 | △ | △ | ○ | ○ |

FIG.26

LIST OF EVALUATION RESULTS

|  | SAMPLE A | SAMPLE B | SAMPLE C | SAMPLE D |
|---|---|---|---|---|
| EIGHTH EMBODIMENT | ○ | ○ | ○ | ○ |
| NINTH EMBODIMENT | ○ | ○ | ○ | ○ |
| TENTH EMBODIMENT | ○ | ○ | ○ | ○ |
| ELEVENTH EMBODIMENT | ○ | ○ | ○ | ○ |
| COMPARISON EXAMPLE 4 | × | × | ○ | ○ |
| COMPARISON EXAMPLE 5 | × | × | ○ | ○ |
| COMPARISON EXAMPLE 6 | × | × | ○ | ○ |

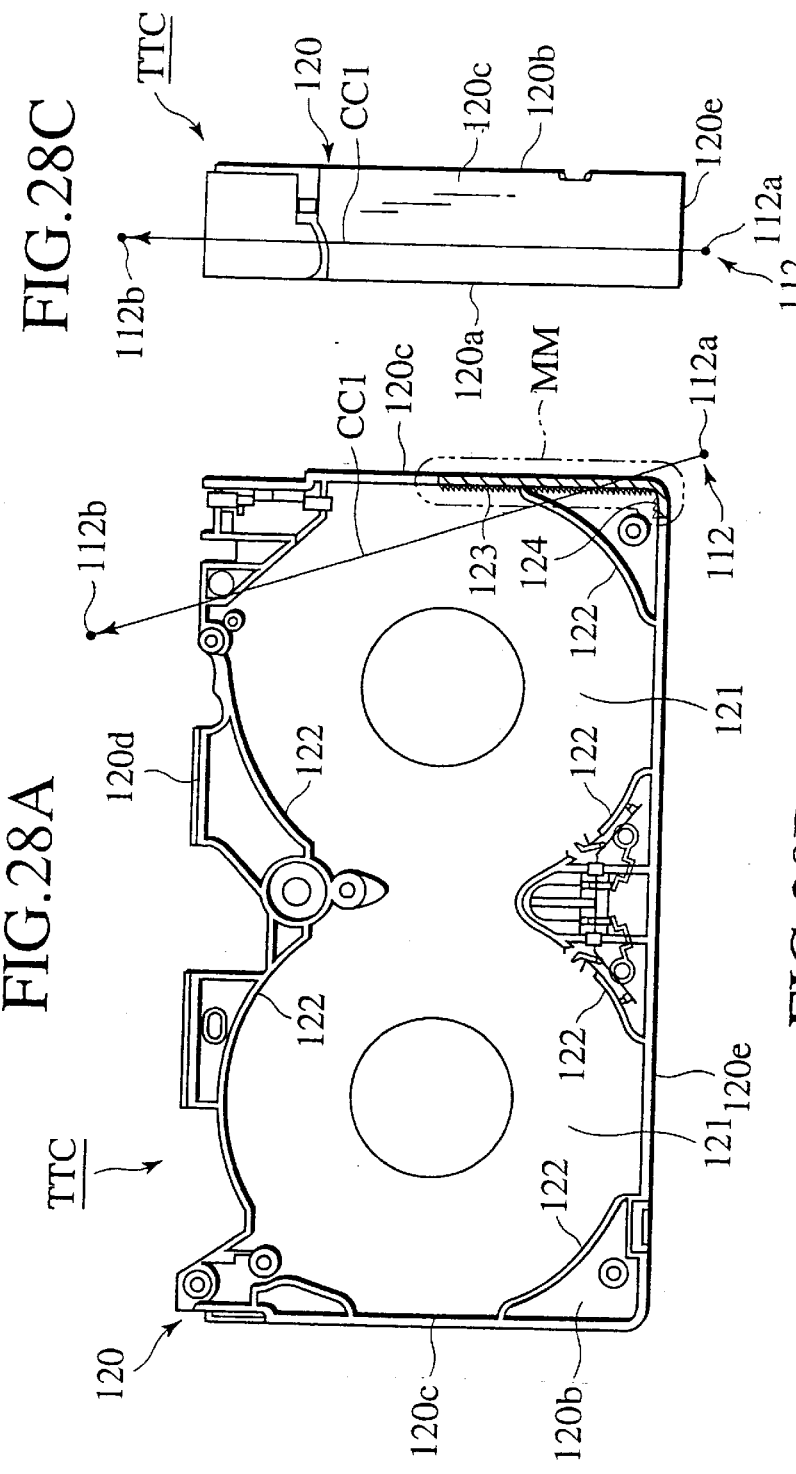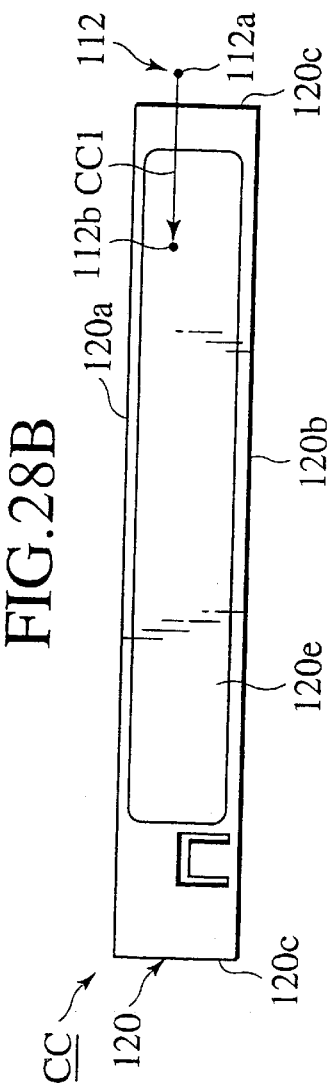

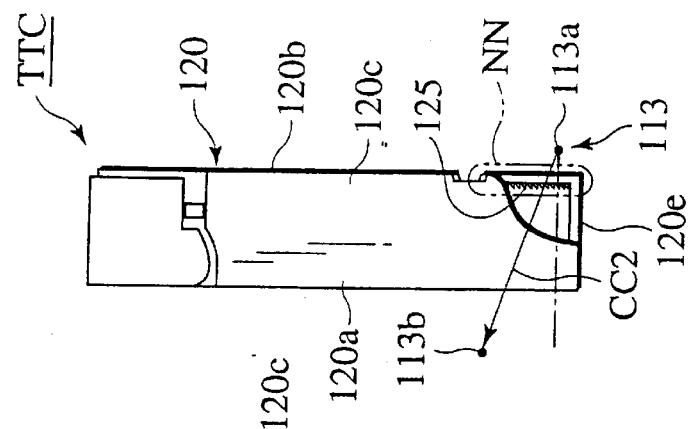
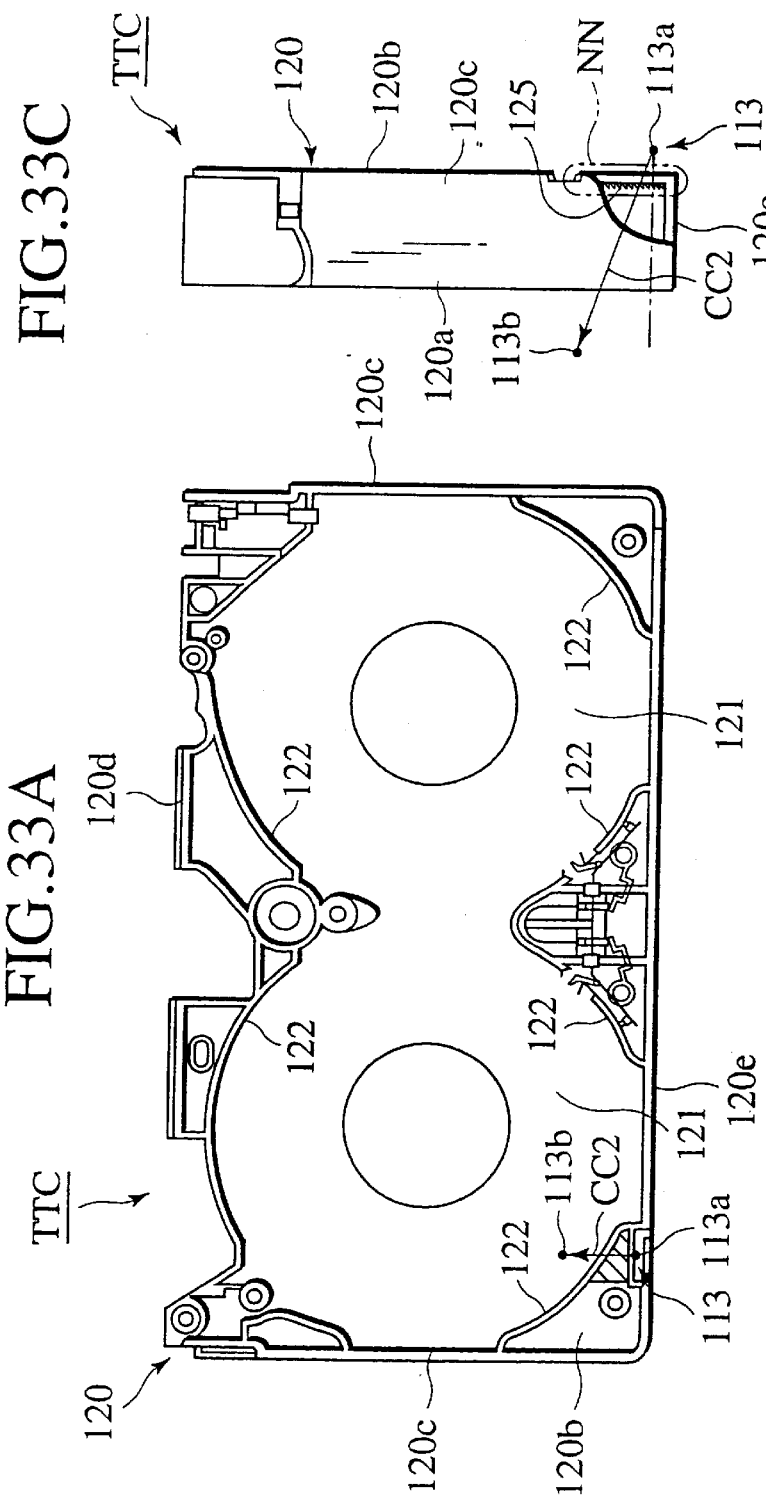
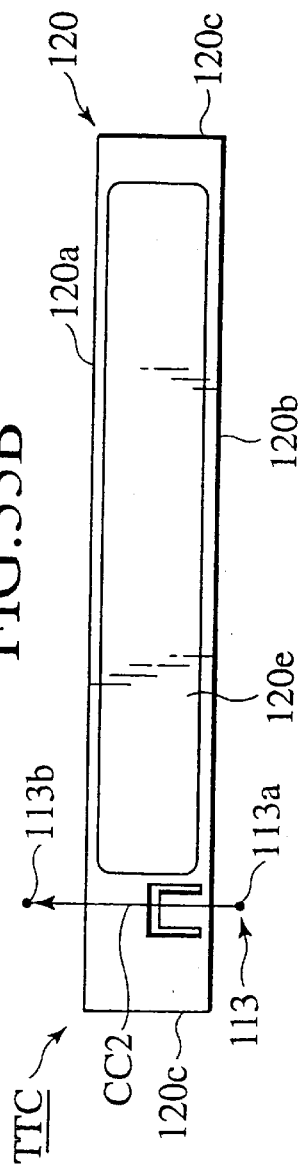

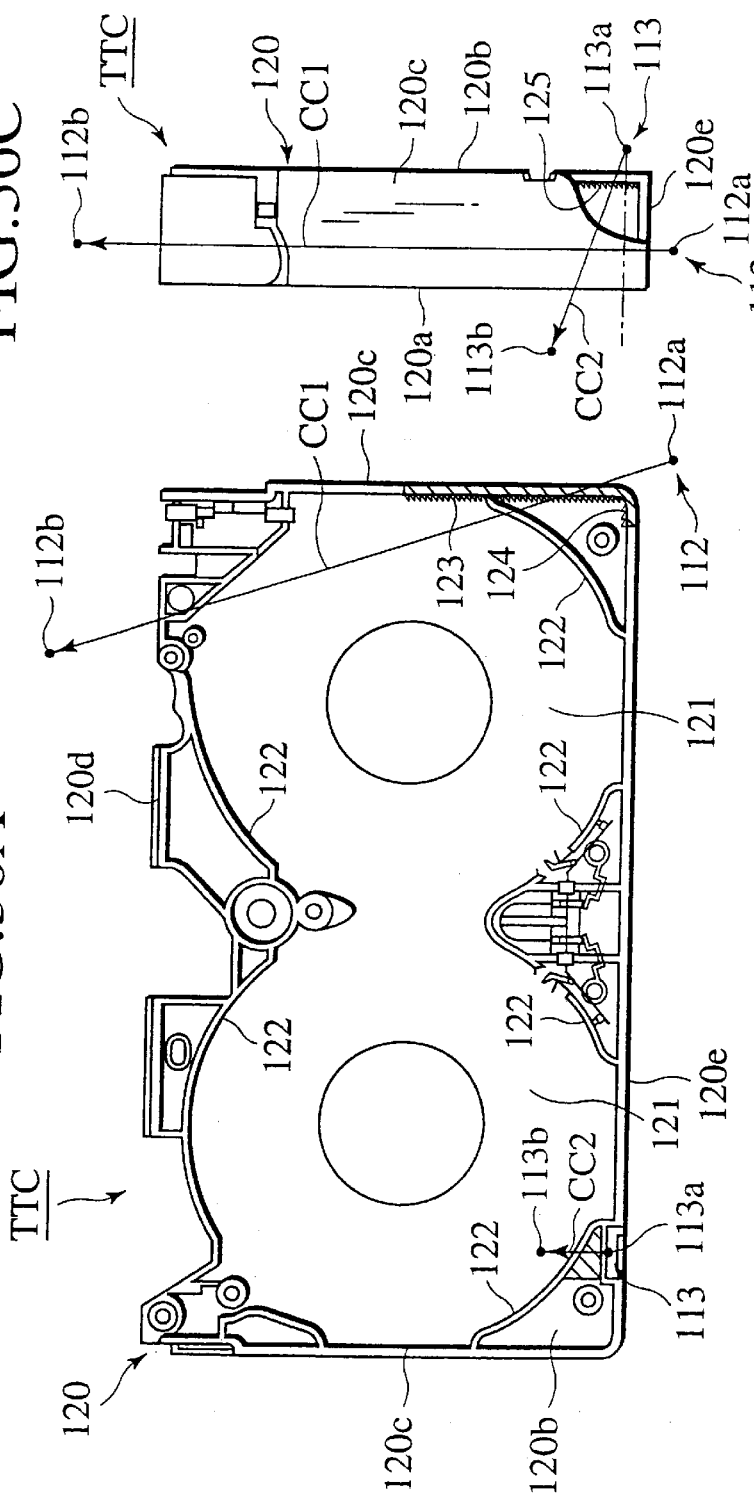
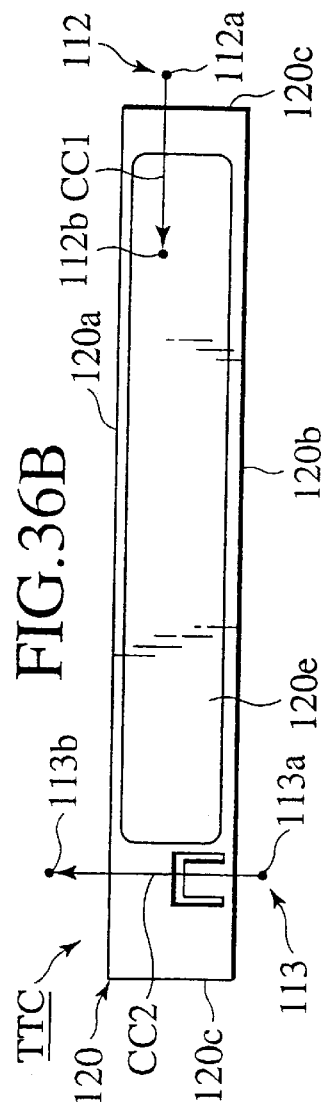
FIG.36A  FIG.36B  FIG.36C

TAPE CASSETTE OF HIGH TRANSPARENCY MATERIAL

This application is a continuation of Ser. No. 09/588,372, filed Jun. 7, 2000, now U.S. Pat. No. 6,587,306.

BACKGROUND OF THE INVENTION

1. Field of the Invention

The present invention relates to a tape cassette formed of a high transparency material and having tape ends thereof detected and a tape cassette of which the presence/absence is detected.

2. Description of the Related Art (Conventional Tape Cassette Regarding the Detection of a Tape End)

The applicant of the present application proposed a tape cassette, as the conventional tape cassette of this type, disclosed by Japanese Utility Model Examined Application Publication No. 63-25595. FIG. 1 is a partially-cut perspective view of the tape cassette; FIG. 2 is a plan view of a lower case portion thereof; FIG. 3 is a perspective view of part S shown in FIG. 2; FIG. 4 is a perspective view of part E of FIG. 2; and FIG. 5 is a perspective view of part F of FIG. 2.

In FIGS. 1 and 2, a cassette case 1 consists of a lower case portion 2 and an upper case portion 3. The case portions 2 and 3 are assembled with their respective junction surfaces abutting on each other. A pair of tape containers 4, 4 are provided in this cassette case 1. Reels 5, 5 are rotatably arranged in the paired tape containers 4, 4, respectively. A tape (not shown) is wound around the paired reels 5, 5 and constituted so that the rotation of the reels 5, 5 allows the traveling of the tape. Also, a cover lock container 6 is provided on one front end portion of the cassette case 1 to be surrounded by wall portions 10d and 10e. A cover lock member 7 is rockably arranged in the cover lock container 6. The cover lock member 7 locks a cover (not shown) to a closed position. While a cassette is inserted into a recording and reproducing apparatus, the position of the cover is changed to an unlocked position.

A light emission element insertion hole 11 is provided at the central position of the lower case 2 to be surrounded by the wall portion 10a. While the tape cassette is being installed into the recording and reproducing apparatus, the light emission element 12 of the recording and reproducing apparatus is arranged in the light emission insertion hole 11. The recording and reproducing apparatus is provided with a pair of right and left light reception elements 13a and 13b. The paired light reception elements 13a and 13b are positioned outward of the right and left sides of the tape cassette, respectively while the tape cassette is being installed into the recording and reproducing apparatus. The tape cassette is also provided with sensor optical path holes 14a to 14e and 17a to 17d in wall portions 10a to 10e and 16a to 16d, respectively, which are positioned on straight lines L1 and L2 coupling the position of the light emission element 12 with the paired right and left light reception elements 13a, and 13b, respectively.

To be specific, the light which advances from the light emission element 12 in right direction, is introduced into the tape container 4 by way of the sensor optical path hole 14a of the right semicylindrical wall portion 10a constituting the light emission element insertion hole 11 and the sensor optical path hole 14b of the wall portion 10b constituting tape container 4. FIG. 3 shows the sensor optical path holes 14a and 14b provided in the lower case portion 2. It is noted that sensor optical path holes (not shown) are also provided at the corresponding positions of the upper case 3. To be exact, the holes of the upper and lower cases 2 and 3 constitute the respective sensor optical path holes. After the light which is introduced into the tape container 4 passes through the tape traveling path on which the pulled-out tape travels, the light is introduced to the outside of the tape cassette by way of the sensor optical path hole 14c of the wall portion 10c constituting the tape container 4, the sensor optical path hole 14d of the wall portion 10d constituting the cover lock container 6 and the sensor optical path hole 14e of the wall portion 10e on the side surface of the cassette (which wall portion also serves as one constituting the cover lock container 6) and reaches the light reception element 13a. FIG. 4 shows the sensor optical path holes 14c to 14e provided in the lower case portion 2. It is noted that sensor optical path holes are also provided at the corresponding positions of the upper case portion 3 (except for the sensor optical path hole in the wall portion on the side surface of the cassette). To be exact, the holes of the upper and lower case portions 2 and 3 constitute the respective sensor optical path holes.

The light which advances from the light emission element 12 in left direction, is introduced into the tape container 4 by way of the sensor optical path hole 17a of the left semicylindrical wall portion 16a and the sensor optical path hole 17b of the wall portion 16b constituting the tape container 4. FIG. 3 shows the sensor optical path holes 17a and 17b provided in the lower case portion 2. It is noted that sensor optical holes (not shown) are also provided at the corresponding positions of the upper case 3. To be exact, the holes of the upper and lower case portions 2 and 3 constitute the respective sensor optical path holes. After the light which is introduced into the tape container 4 passes through a tape traveling path on which the pulled-out tape travels, the light is introduced to the outside of the tape cassette by way of the sensor optical path hole 17c of the wall portion 16c constituting the tape container 4, the sensor optical path hole 18a of a tape pad 18 which is a transparent member and the sensor optical path hole 17d of the wall portion 16d on the side surface of the cassette and reaches the light reception element 13b. FIG. 5 shows the sensor optical path holes 17c and 17d and the optical path hole 18a of a tape pad 18 provided in the lower case portion 2. It is noted that sensor optical path holes are also provided at the corresponding positions of the upper case portion 3, respectively (except for the optical path hole in the wall portion on the side surface of the cassette). To be exact, the holes of the upper and lower case portions 2 and 3 constitute the respective sensor optical path holes.

The wall portions 10c to 10e, 16a to 16d and the like which constitute the sensor optical path holes 14c to 14e and 15a to 15d on the optical path for the light from the light emission element 12 which comes out of the tape container 4, are colored with a low light reflectance color. In FIGS. 4 and 5, the colored portions of the lower case portion 2 are indicated by hatching. The corresponding portions of the upper case portion 3 are colored, as well.

With the above constitution, the light which advances from the light emission element 12 in right direction reaches the tape traveling path by way of the sensor optical path holes 14a and 14b. If a tape on the tape traveling path is a magnetic recording layer tape part, it does not transmit light and the light does not reach the light reception element 13a. If the tape on the tape traveling path is a high light transmittance leader tape part, it transmits light and the light reaches the light reception element 13a by way of the sensor optical path holes 14c to 14e. Further, the light which advances from the light emission element 12 in left direction reaches the tape traveling path by way of the sensor optical path holes 17a and 17b. If the tape on the tape traveling path is a magnetic recording layer tape part, it does not transmit light and the light does not reach the light reception element 13b. If the tape on the tape traveling path is a high light transmittance leader tape part, it transmits light and the light reaches the light reception element 13b by way of the sensor optical path holes 17c, 18a and 17d. Using the difference in the output voltages of the light reception elements 13a and 13b between a case where the tape on the tape traveling path is the magnetic recording layer tape part and a case where the tape is the leader tape part, it is detected whether the tape end is at a take-up side or a supply side.

Meanwhile, the light from the light emission element 12 contains not only components advancing toward the light reception elements 13a and 13b but also those which may be reflected by the flanges of the reels 5, the inner surface of the cassette case 1 and the like and which may reach the light reception elements 13a and 13b without passing the tape traveling path. Further, there are cases where external light is incident on the interior of the cassette case 1 from the windows or the like on the upper surface of the tape containers 4 of the tape cassette, the incident light is reflected by the flanges of the reels 5, the inner surface of the cassette case 1 and the like and reaches the light reception elements 13a and 13b without passing the tape traveling path.

Here, if the cassette case 1 itself is formed out of a low light reflectance material such as a black material, the quantity of light which reaches the light reception elements is very small. Due to this, the light reception elements 13a and 13b, less likely, malfunction. Conversely, if the cassette case 1 itself is desired to be formed out of a material having high light reflectance or high transparency, the quantity of the above-stated unnecessary light which reaches the light reception elements 13a and 13b becomes disadvantageously large.

In spite of the above fact, according to the conventional case, portions close to the light reception elements 13a and 13b are colored with a low light reflectance color, thereby making it possible to sufficiently attenuate the unnecessary light at those positions and to prevent the light reception elements 13a and 13b from malfunctioning. In other words, it is possible to produce a colorful tape cassette without the need to consider the color of the cassette case 1 and the like. (Tape Cassette Regarding the Detection of the Presence/Absence of the Tape Cassette)

The tape cassette is employed in various apparatuses beside the recording and reproducing apparatus. They involve, for example, an operational cassette changer for a duplicator. FIGS. 6 and 7 show an example of usage of the cassette changer. In FIGS. 6 and 7, a recording and reproducing apparatus 101 is a tape dubbing apparatus having two cassette drives and the like. A cassette changer 103 is coupled to one cassette insertion port of the recording and reproducing apparatus 101 through a coupling portion 102.

The cassette changer 103 has a cassette tray 105 slidably arranged in a changer main body 104. The cassette tray 105 is moved between a cassette reference position and the cassette delivery position of the recording and reproducing apparatus 101. A pair of cassette stoppers 107 are provided above the cassette tray 105 so as to hold a tape cassette 106 at a cassette set position. The paired cassette stoppers 107 are moved to be apart from each other (in arrow directions shown in FIG. 6B), whereby the tape cassette 106 drops into the cassette tray 105 while being guided by rollers 108.

A cassette press arm 110 sliding along a guide rail 109 is also provided at the changer main body 104. The cassette press arm 110 presses the side surface of the tape cassette 106, whereby the tape cassette 106 can be moved from the cassette reference position of the cassette tray 105 to a cassette eject position (cassette position) on a storage 111. The storage 111 is provided laterally of the cassette tray 105. The changer main body 104 is provided with cassette presence detection means 112 for detecting whether or not the tape cassette 106 is at the cassette ejection position on the storage.

The cassette presence detection means 112 has a light emission portion 112a and a light reception portion 112b receiving a detected light from the light emission portion 112a. The optical path CC of the detected light which has reached the light reception portion 112b from the light emission portion 112a is set to pass the cassette ejection position which is the cassette position.

Next, the function of the above-stated constitution will be described. As indicated by virtual lines shown in FIGS. 6A and 6B, the tape cassette 106 is set at the cassette position. In a start mode, the paired cassette stoppers 107 are moved to be away from each other and the tape cassette 106 drops into the cassette reference position on the cassette tray 105. Then, the cassette tray 105 moves to the cassette delivery position of the recording and reproducing apparatus 101 and the tape cassette 106 is installed into the recording and reproducing apparatus 101, thereby starting dubbing. When dubbing is finished, the tape cassette. 106 is ejected from the recording and reproducing apparatus 101 and returned onto the cassette tray 105. Thereafter, the cassette tray 105 is moved to the cassette reference position and the tape cassette 106 at the cassette reference position is pressed by the cassette press arm 110 and ejected to the cassette ejection position (a state shown in FIGS. 7A and 7B).

If the next tape cassette 106 is put at the cassette set position, a start mode is selected and dubbing is executed through the same operation process stated above. If a user removes the tape cassette 106 from the cassette ejection position, detected light from the light emission portion 112a is not shielded by the tape cassette 106 and reaches the light reception portion 112b. Thus, the cassette presence detection means 112 detects that the tape cassette 106 is not at the cassette ejection position and then the tape cassette 106 is ejected to the cassette ejection position through the same operation process stated above. On the other hand, if the user does not remove the tape cassette 106 completed with dubbing from the cassette ejection position, detected light from the light emission portion 112a is shielded by the tape cassette 106 and does not reach the light reception portion 112b. Thus, the cassette presence detection means 112 detects that the tape cassette 106 is at the cassette ejection position, whereby even if there is a tape cassette 106 to be completed with dubbing, the tape cassette 106 is prohibited from being ejected to the cassette ejection position.
(Tape Cassette Regarding the Detection of a Tape End)

According to the above-stated conventional tape cassette, it is required to color the portions of the cassette case 1 near the light reception elements 13a and 13b. Due to this, a coloring step which is quite laborious is included in processing steps, with the result that production efficiency disadvantageously, greatly deteriorates and demand for mass production cannot be disadvantageously met.

Further, there is demand for forming the cassette case 1 itself out of a high transparency material. In that case, if the portions of the cassette case 1 are colored with a low light reflectance color, the color disadvantageously differs from an originally intended color.

(Tape Cassette Regarding the Detection of Presence/Absence of the Tape Cassette)

If there is demand for forming the cassette case itself of the cassette 106 out of high transparency material and the tape cassette 106 is formed according to the demand, there is a possibility that a detection error occurs to the cassette presence detection means 112 described above. That is, even if the tape cassette 106 is at the cassette ejection position, the detected light from the light emission portion 112a transmits the cassette case and reaches the light reception portion 112b and the cassette presence detection means erroneously detects that the cassette is absent. If such an erroneous detection is made, the next tape cassette 106 is fed to the cassette ejection position even while the tape cassette 106 is at the cassette ejection position. As a result, the earlier tape cassette 106 drops from the storage 111 and damaged or, if the storage 111 has a drop preventive wall, a heavy load is applied to the cassette press arm 110 and the cassette changer 103 and the like are damaged.

SUMMARY OF THE INVENTION

It is, therefore, an object of the present invention to provide a tape cassette to solve the above-stated problems and capable of preventing malfunction in tape end detection irrespectively of the characteristics (color, transparency and reflectance) of a cassette case without extreme deterioration of production efficiency and capable of maintaining a color originally intended for the cassette case as much as possible if the cassette case itself is formed out of a high transparency material.

It is also an object of the present invention to provide a tape cassette to solve the above-stated problems and capable of preventing a cassette detection error even if a cassette case is formed out of a high transparency material.

To achieve the above object, there is provided a tape cassette having a pair of reels rotatably provided in a pair of tape containers, respectively, a tape being wound around the pair of reels and contained in the pair of tape containers, the tape consisting of a magnetic recording layer tape part and high light transmittance leader tape parts added to both ends of the tape, respectively, and having sensor optical path holes provided on wall portions, respectively, on a straight line coupling a position of a light emission element of a recording and reproducing apparatus with a position of a light reception element of the recording and reproducing apparatus so that light from the light emission element is introduced into the tape containers and light passing through tape running paths of the tape containers comes out of the tape containers and reaches the light reception element while the tape cassette is installed into the recording and reproducing apparatus, wherein a light shielding portion having a light shielding effect is provided around at least one of the sensor optical path hole right after the light from the light emission element comes out of one of the tape containers and next the sensor optical path hole.

According to the present invention, since a light shielding portion having a light shielding effect is provided around at least one of the sensor optical path hole right after the light from the light emission element comes out of one of the tape containers and next the sensor optical path hole, it suffices to provide light shielding portions around the two sensor optical path holes at most. Thus, it is possible to prevent malfunction in tape end detection irrespectively of the characteristics (color, transparency and reflectance) of the cassette case, capable of responding to the demand of mass production without greatly deteriorating production efficiency, and capable of maintaining a color originally intended for the cassette case as much as possible if the cassette case itself is formed out of a high transparency material.

In a preferred embodiment of the present invention, the light shielding portion is provided to have right and left widths of about not less than 1 mm from a center of an optical path coupling the position of the light emission element with the position of the light reception element by the straight line and to spread over an entire height of at least one of the wall portion right after the light from the light emission element comes out of one of the tape containers and the next wall portion.

According to this embodiment, it is possible to ensure preventing malfunction in tape end detection.

In a preferred embodiment of the present invention, the light shielding portion is formed out of a light shielding member bonded to at least one of the wall portion right after the light from the light emission element comes out of one of the tape containers and the next wall portion.

According to this embodiment, since it suffices to bond the light shielding members to two wall portions at most, it can be expected that production efficiency further enhances.

In a preferred embodiment of the present invention, the light shielding portion is constituted by forming the wall portion right after the light from the light emission element comes out of at least one of the tape containers and the next wall portion itself, out of a light shielding member to be colored with two colors when forming a cassette case.

According to this embodiment, since it suffices to form the cassette case to be colored with two colors, it can be expected that production efficiency further enhances.

In a preferred embodiment of the present invention, the light shielding portion is constituted by attaching a light shielding holder having the sensor optical path hole to at least one of the wall portion right after the light from the light emission element comes out of at least one of the tape containers and the next wall portion.

According to this embodiment, since it suffices to attach the light shielding holders to two wall portions at most, it can be expected that production efficiency further enhances.

Further, to achieve the above object, there is provided a tape cassette having a pair of reels rotatably provided in a pair of tape containers, respectively, a tape being wound around the pair of reels and contained in the pair of tape containers, the tape consisting of a magnetic recording layer tape part and high light transmittance leader tape parts added to both ends of the tape, respectively, and having sensor optical path holes provided on wall portions, respectively, on a straight line coupling a position of a light emission element of a recording and reproducing apparatus with a position of a light reception element of the recording and reproducing apparatus so that light from the light emission element is introduced into the tape containers, light passing through tape running paths of the tape containers comes out of the tape containers, passes through a cover lock container and reaches the light reception element while the tape cassette is installed into the recording and reproducing apparatus, wherein a cylindrical protrusion having a light shielding effect is provided at a cover lock member arranged in the cover lock container, and a sensor optical path hole arranged on the straight line coupling the position of the light emission element with the position of the light reception element is provided at the cylindrical protrusion while the cover lock member is at an unlock position.

According to the present invention, even if unnecessary light is incident on the sensor optical path hole of the cylindrical protrusion, it abuts on the inner surface of the sensor optical path hole and shielded by the absorption effect thereof. Thus, it is possible to prevent malfunction in tape end detection irrespectively of the characteristics (color, transparency and reflectance) of the cassette case, capable of responding to the demand of mass production without greatly deteriorating production efficiency, and capable of maintaining a color originally intended for the cassette case as much as possible if the cassette case itself is formed out of a high transparency material.

Moreover, to achieve the above object, there is provided a tape cassette having a pair of reels rotatably provided in a pair of tape containers, respectively, a tape wound around the pair of reels and contained in the pair of tape containers, the tape consisting of a magnetic recording layer tape part and high light transmittance leader tape parts added to both ends of the tape, respectively, and having sensor optical path holes provided on wall portions on a straight line coupling a position of a light emission element of a recording and reproducing apparatus with a position of a light reception element of the recording and reproducing apparatus so that light from the light emission element is introduced into the tape containers and light passing through tape running paths of the tape containers comes out of the tape containers and reaches the light reception element while the tape cassette is installed into the recording and reproducing apparatus, wherein at least one of an upper flange and a lower flange of each of the pair of reels is formed out of a reflection light attenuating material and a reflection light attenuating color.

According to the present invention, since unnecessary light abuts on the flange portions of the reels and shielded by the absorption effect thereof, it is possible to prevent malfunction in tape end detection irrespectively of the characteristics (color, transparency and reflectance) of the cassette case, capable of responding to the demand of mass production without greatly deteriorating production efficiency, and capable of maintaining a color originally intended for the cassette case as much as possible if the cassette case itself is formed out of a high transparency material.

Furthermore, to achieve the above object, there is provided a tape cassette provided with a light emission portion and a light reception portion for receiving detection light from the light emission part at an apparatus side, an optical path of the detection light reaching the light reception portion from the light emission portion set to pass a cassette position, and used with an apparatus for detecting presence and absence of the tape cassette depending on whether the detection light from the light emission portion reaches the light reception portion, wherein a cassette case is formed out of a high transparency material, and a prism portion for refracting or reflecting incident light in an emission direction in which the incident light does not reach the light reception portion is provided at a position of the cassette case on the optical path of the detection light.

According to the present invention, if the tape cassette is at the cassette position, the detection light from the light emission portion is refracted or totally reflected by the prism portion and does not reach the light reception portion. Thus, it is possible to prevent a cassette detection error in the tape cassette with a high transparency cassette case.

In a preferred embodiment of the present invention, the prism portion is formed integrally with the cassette case.

According to this embodiment, since the prism portion is formed simultaneously with the cassette case, the prism portion can be easily produced at low cost. In addition, compared with a case of providing a light shielding member at the position of the prism portion, this embodiment has advantages in that an assembly step is not necessary and problems such as attachment error, peeling and the like can be avoided.

In a preferred embodiment of the present invention, the prism portion is provided at a position of the cassette case on which the detection light emitted from the light emission portion is incident first.

According to this embodiment, since the distance from the prism portion to the light reception portion is long and it is possible to prevent the detection light from reaching the light reception portion even if a prism deviation angle is set small, the degree of freedom for prism design increases.

In addition, to achieve the above object, there is provided a tape cassette provided with a light emission portion for cassette presence and absence detection and a light reception portion for cassette presence and absence detection receiving detection light from the light emission part at an apparatus side, an optical path of the detection light reaching the light reception portion from the light emission portion set to pass a cassette position, and used with an apparatus for detecting presence and absence of the tape cassette depending on whether the detection light from the light emission portion reaches the light reception portion, and provided with a light emission portion for cassette end detection and a light reception portion for cassette end detection receiving detection light from the light emission portion at an apparatus side, and used with an apparatus for detecting presence and absence of a tape end depending on whether the detection light from the light emission portion reaches the light reception portion, wherein a light shielding member is provided on an optical path for tape end detection to block passage of unnecessary light deviated from the optical path; and the light shielding member is extended and an extended portion of the light shielding member is arranged on an optical path for cassette presence and absence detection.

According to the present invention, the prevention of malfunction in tape end detection is ensured for a high transparency cassette case, and further it is possible to prevent a cassette detection error without increasing the number of parts and deteriorating assemblage.

Further, to achieve the above object, there is provided a tape cassette used with an apparatus for detecting a tape terminal end depending on whether tape end detection light from a light emission portion reaches a light reception portion, wherein a prism portion for refracting or reflecting the tape end detection light from the light emission portion in an emission direction in which the light does not reach the light reception portion, is provided on a wall around an optical path notch through which the tape end detection light passes.

According to the present invention, since the tape end detection light from the light emission portion is refracted or totally reflected by the prism portion and does not reach the light reception portion, it is possible to prevent a cassette detection error in a tape cassette with a high transparency cassette case.

Also, to achieve the above object, there is provided a tape cassette provided with two light emission portions for cassette presence and absence detection and two light reception portions for cassette presence and absence detection receiving detection lights from the light emission portions at an apparatus side, first and second optical paths of first and second detection lights reaching the light reception portions from the light emission portions, respectively, set to pass a cassette position, and used with an apparatus for detecting presence and absence of the tape cassette depending on whether the first detection light and second detection light from the respective light emission portions reach the respective light reception portions; and provided with two light emission portions for tape end detection and two light reception portions for tape end detection receiving detection lights from the light emission portions at an apparatus side, third and fourth optical paths of third and fourth detection lights reaching the light reception portions from the light emission portions, respectively, set to pass the tape position, and used with an apparatus for detecting presence and absence of a tape end depending on whether the third detection light and fourth detection light from the light emission portions reach the respective light reception portions, wherein a cassette case is formed out of a high transparency material; prism portions for refracting or reflecting the first and second detection lights for cassette presence and absence detection in a direction in which the first detection light and second detection light do not reach the respective light reception portions, are provided at positions of the cassette case on first and second optical paths of the first and second lights for cassette presence and absence detection, respectively; and light shielding members are provided on third and fourth optical paths of third and fourth lights for tape end detection to block passage of unnecessary light deviated from the third and fourth optical paths, respectively.

According to the present invention, it is possible to ensure preventing malfunction in tape end detection for a high transparency cassette case and to prevent a tape cassette presence/absence detection error.

Moreover, to achieve the above object, there is provided a tape cassette provided with two light emission portions for cassette presence and absence detection and two light reception portions for cassette presence and absence detection receiving detection lights from the light emission portions at an apparatus side, first and second optical paths of first and second detection lights reaching the light reception portions from the light emission portions, respectively, set to pass a cassette position, and used with an apparatus for detecting presence and absence of the tape cassette depending on whether the first detection light and second detection light from the respective light emission portions reach the respective light reception portions; and provided with two light emission portions for tape end detection and two light reception portions for tape end detection receiving detection lights from the light emission portions at an apparatus side, third and fourth optical paths of third and fourth detection lights reaching the light reception portions from the light emission portions, respectively, set to pass the tape position, and used with an apparatus for detecting presence and absence of a tape end depending on whether the third detection light and fourth detection light from the light emission portions reach the respective light reception portions, wherein a cassette case is formed out of a high transparency material; a prism portion for refracting or reflecting the first detection light for cassette presence and absence detection in a direction in which the first detection light does not reach the light reception portion, is provided at a position of the cassette case on a first optical path of the first detection light; a first light shielding member is provided on a second optical path of the second detection light for cassette presence and absence detection, a second light shielding member is provided on a third optical path of the third detection light for tape end detection to block unnecessary light deviated from the third optical path; and a third light shielding member is provided on a fourth optical path of the fourth detection light for tape end detection to block unnecessary light deviated from the fourth optical path.

According to the present invention, it is possible to ensure preventing malfunction in tape end detection for a high transparency cassette case and to prevent a tape cassette presence/absence detection error.

In a preferred embodiment of the present invention, the first light shielding member is extended and an extended portion of the first light shielding member is set as the second light shielding member.

According to this embodiment, it is possible to reduce the number of parts and the number of assembly steps and to enhance production efficiency.

The nature, principle and utility of the invention will become more apparent from the following detailed description when read in conjunction with the accompanying drawings.

BRIEF DESCRIPTION OF THE DRAWINGS

In the accompanying drawings:

FIG. 18 shows a list of malfunction evaluation results of the first and second embodiments and the comparison examples;

FIG. 26 shows a list of malfunction evaluation results of the eighth to eleventh embodiments and the comparison examples;

FIGS. 28A to 28C show the fourteenth embodiment of the present invention, wherein FIG. 28A is a plan view of a tape cassette from which only the upper surface portion of a cassette case is removed, FIG. 28B is a back view of the tape cassette and FIG. 28C is a side view of the tape cassette;

FIGS. 33A to 33C show the sixteenth embodiment of the present invention, wherein FIG. 33A is a plan view of a tape cassette from which only the upper surface portion of a cassette case is removed, FIG. 33B is a back view of the tape cassette and FIG. 33C is a side view of the tape cassette;

FIGS. 36A to 36C show the seventeenth embodiment of the present invention, wherein FIG. 36A is a plan view of a tape cassette from which only the upper surface portion of a cassette case is removed, FIG. 36B is a back view of the tape cassette and FIG. 36C is a side view of the tape cassette;

FIGS. 41A to 41C show the nineteenth embodiment of the present invention, wherein FIG. 41A is an explanatory view of the surrounding of the optical path notch of the cassette case of the tape cassette, FIG. 41B shows the optical path of tape end detection light if the prism portion is provided and FIG. 41C shows the optical path of tape end detection light if the prism portion is not provided.

DESCRIPTION OF THE PREFERRED EMBODIMENTS

The embodiments of the present invention will be described hereinafter with reference to the accompanying drawings.

(Embodiments of a Tape Cassette Regarding the Detection of a Tape End)

First to seventh embodiments concern the constitution of a tape cassette relating to the detection of a tape end at a take-up side (tape winding side); eighth to twelfth embodiments concern the constitution thereof relating to the detection of a tape end at a supply side (tape supply side); and the thirteenth embodiment concerns the constitution thereof relating to the detection of tape ends at both the take-up side and the supply side, i.e., the constitution of the tape cassette which deals with both the take-up side and the supply side.

Figure 8A:
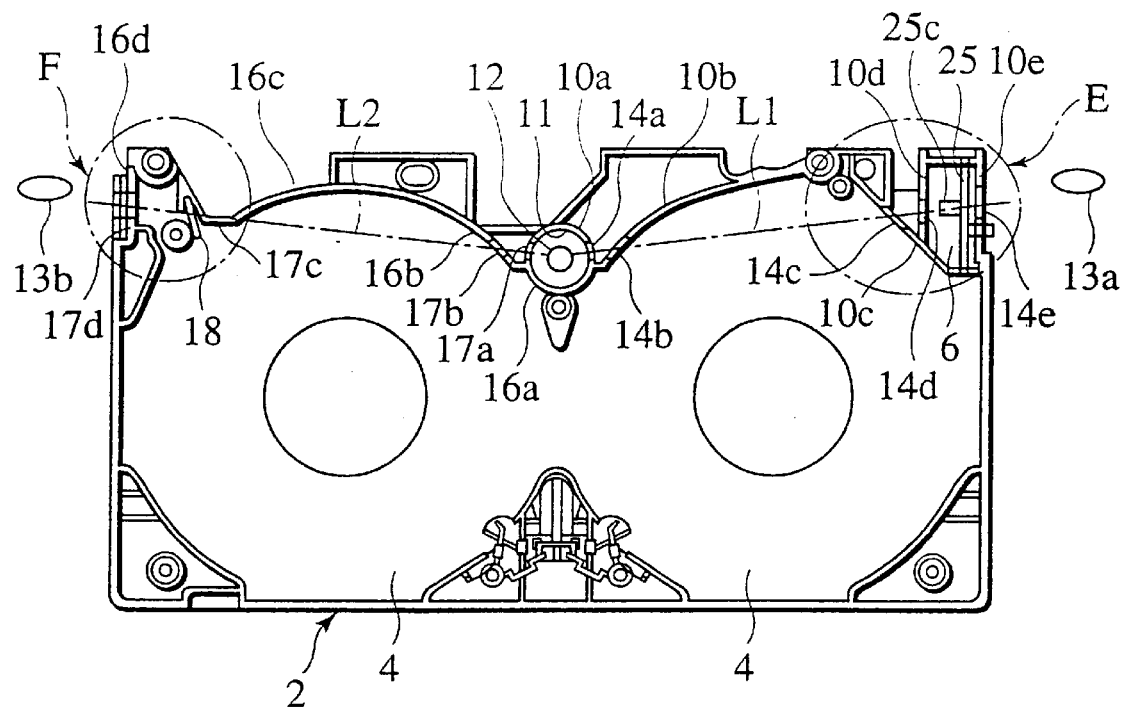
FIG. 8A shows the first embodiment of the present invention and is a plan view of a lower case portion.
Figure 8B:
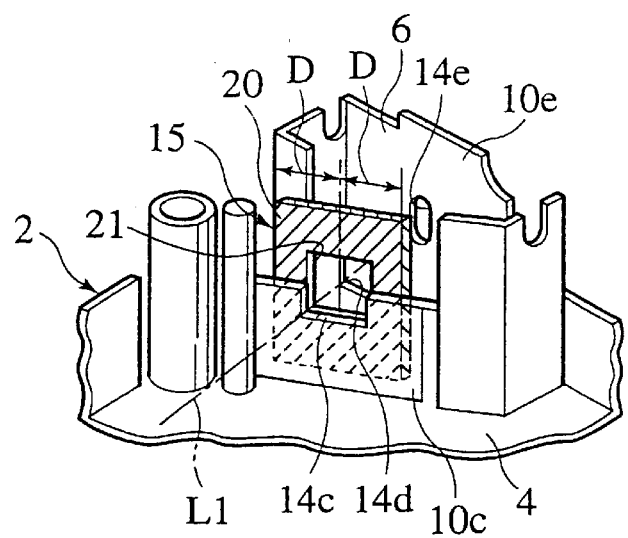
FIG. 8B is a perspective view of part E of FIG. 8A.
Figure 9:
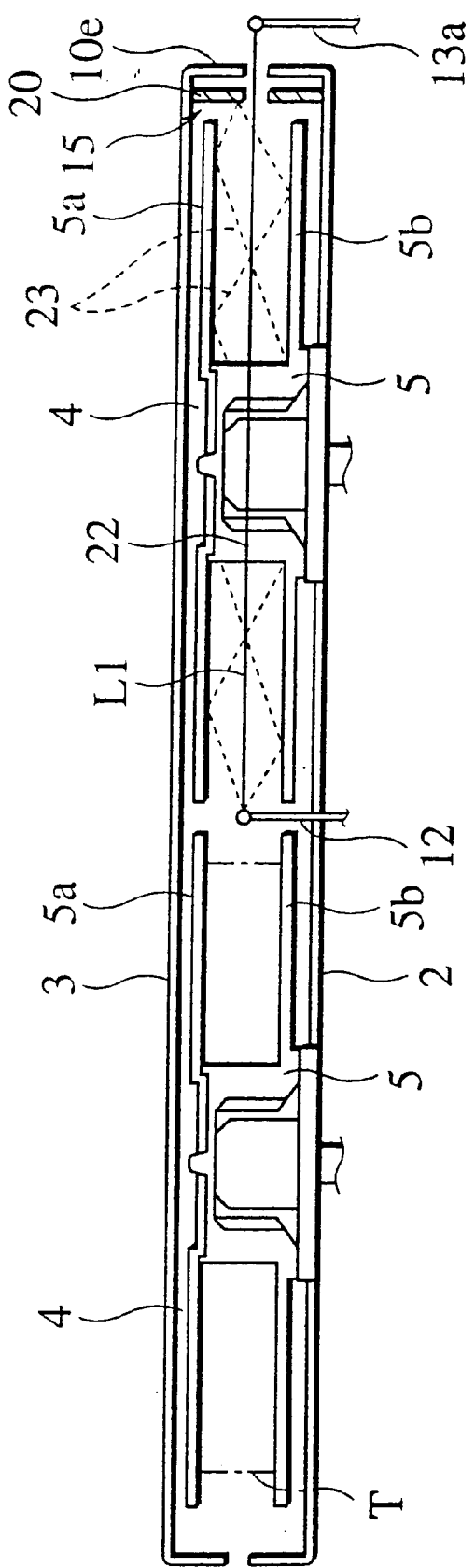
FIG. 9 shows the first embodiment of the present invention and is a schematically longitudinal sectional view of a tape cassette.

FIGS. 8A, 8B and 9 show the first embodiment of the present invention. Specifically, FIG. 8A is a plan view of a lower case portion 2, FIG. 8B is a perspective view of part E of FIG. 8A and FIG. 9 is a schematically longitudinal sectional view of the tape cassette. In FIGS. 8A, 8B and 9, the same constituent elements as those described in the conventional tape cassette regarding the detection of a tape end will not described herein to avoid repetitive description and only different constituent elements will be described. It is noted that the same constituent elements as those of the conventional tape cassette regarding the detection of the tape end are denoted by the same reference symbols to help understand the invention. The same thing is true for the other drawings.

In the first embodiment, a portion close to a light reception element 13a is not colored with a low light reflectance color unlike the conventional tape cassette but a light shielding member 20, serving as a light shielding portion 15, is bonded around a sensor optical path hole 14c just after light from a light emission element 12 comes out of a tape container 4 at a right side (take-up side), as shown in FIG. 8B. The light shielding member 20 is formed out of a light shielding material with a light shielding color and a sensor optical path hole 21 is provided on a portion corresponding to a sensor optical light hole 14c.

The light shielding member 20 is provided to have right and left widths D each of not less than about 1 mm from the center of an optical path coupling the position of the light emission element 12 with that of the light reception element 13a by a straight line L1 and to spread over the entire height of a wall portion 10c. The reason for setting each of the right and left widths D at not less than about 1 mm will be described later in detail.

Although FIG. 8B only illustrates the lower case portion 2, an upper case portion 3 has a wall portion (not shown) at an opposite position to that of the wall portion 10c, as well. The entire height of the wall portion 10c means a total of the heights of the upper and lower case portions 2 and 3. Although the following drawings illustrate only the lower case portion 2, too, the upper case portion 3 has wall portions (not shown) at opposite positions, respectively. If the wall portions are processed, the same process is conducted thereto as that of the wall portions of the lower case portion. Further, the light shielding portion 15 to be described in the second and the following embodiments is also provided to have right and left widths D each of about not less than 1 mm from the center of an optical path coupling the position of the light emission element 12 with that of the light reception element 13a by the straight light L1 and to spread over the entire height of the wall portion 10c.

With the above-stated constitution, light 22 advancing straight to the light reception element 13a, among the light from the light reception element 12, reaches a tape traveling path by way of sensor optical path holes 14a and 14b. If a tape T on the tape traveling path is a magnetic recording layer tape part, the tape T does not transmit light and the light does not, therefore, reach the light reception element 13a. If the tape T is a high light transmittance leader tape part, it transmits light and the light reaches the light reception element 13a by way of sensor optical path holes 14c to 14e.

Further, among light from the light emission element 12, unnecessary light 23 which does not advance straight to the light reception element 13a and unnecessary light 23 incident into the cassette case 1 from a window or the like on the upper surface of the tape container 4 of the tape cassette may be reflected by the upper and lower flanges 5a and 5b of a reel 5, the inner surface of the cassette case 1 and the like and directed toward the light reception element 13a without passing the tape traveling path. Since most of the unnecessary light 23 which may possibly reach the light reception element 13a is abutted against the light shielding member 20 and then shielded by the member 20, the ratio of the unnecessary light which reaches the light reception element 13a is very low.

Accordingly, it is possible to prevent malfunction in the detection of a tape end irrespectively of the characteristics (color, transparency and reflectance) of the cassette case 1. In the production of a tape cassette, it suffices to simply bond the light shielding member 20 to the wall portion 10c. Unlike the conventional tape cassette, therefore, the production efficiency of the tape cassette in this embodiment does not deteriorate greatly. Furthermore, the light shielding member 20 may be bonded to only one wall portion 10c which is not on the outer surface of the cassette case 1. Therefore, if the cassette case itself is made of a high transparency material, a color originally intended for the cassette case 1 can be maintained as much as possible.

Figure 10:
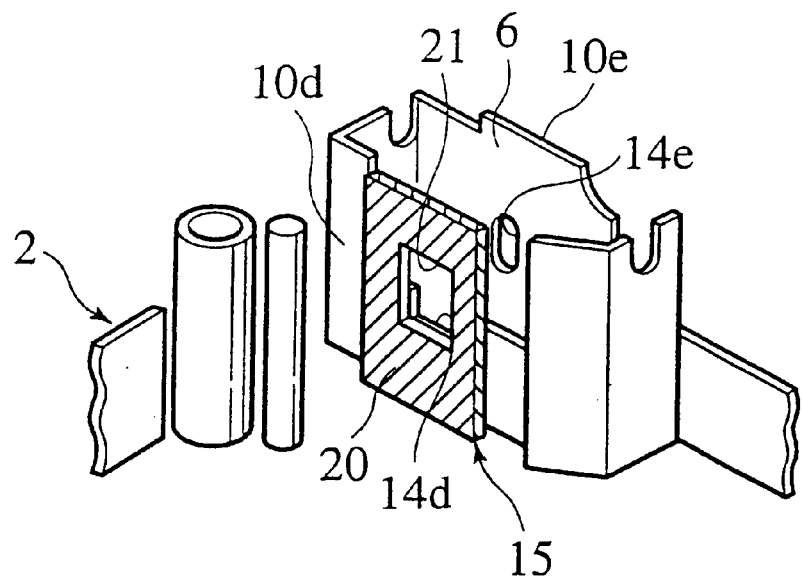
FIG. 10 is a perspective view of the important parts of a lower case portion in the second embodiment according to the present invention.

FIG. 10 is a perspective view of the important parts of the lower case portion 2 in the second embodiment according to the present invention (corresponding to FIG. 8B). In the second embodiment shown in FIG. 10, a light shielding member 20 serving as a light shielding portion 15 is bonded not to a portion just after light from a light emission element 12 comes out of a tape container 4 but bonded around the next sensor optical path hole 14d. In FIG. 10, the light shielding member 20 is shown bonded to a wall portion 10d at a wall portion 10c side. Needless to say, the member 20 may be bonded to a wall portion 10d at a wall portion 10e side. The remaining constituent elements are the same as those in the first embodiment, which description will not be, therefore, given herein.

It can be expected that the second embodiment provides the same function and advantages as those of the first embodiment.

As a modification of the first and second embodiments, the light shielding member 20 may be bonded around the sensor optical path hole 14c right after light from the light emission element 12 comes out of the tape container 4 and the next sensor optical path hole 14d. Since this modification can further enhance unnecessary light shielding effect, it is possible to further prevent malfunction in detecting the tape end of a tape T. In this case, however, the light shielding member 20 is bonded to the two portions and is slightly disadvantageous in production efficiency. Nevertheless, the production efficiency of this modification is sufficiently advantageous over the conventional cassette case.

Figure 1:
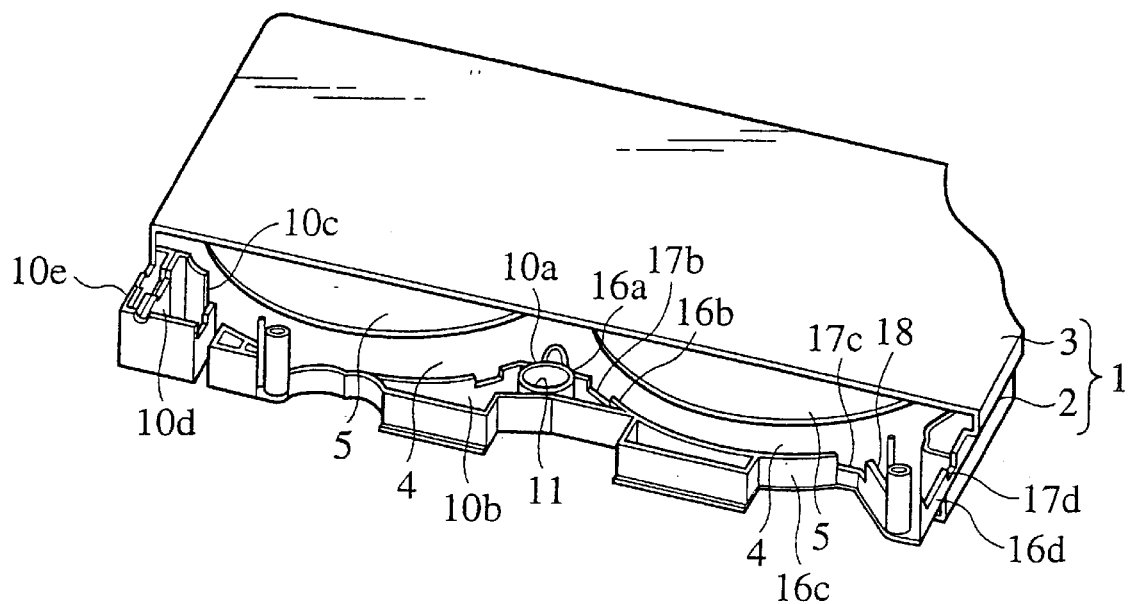
FIG. 1 shows prior art regarding the detection of a tape and is a partially cut perspective view of a tape cassette.
Figure 2:
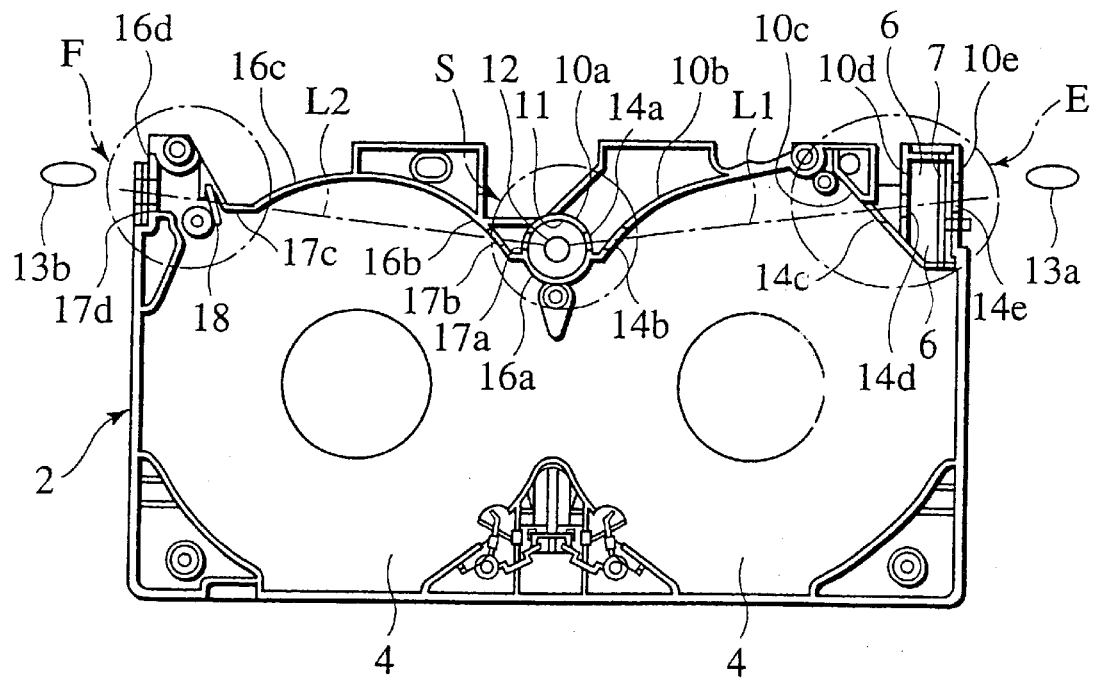
FIG. 2 shows prior art regarding the detection of a tape and is a plan view of a lower case portion.
Figure 3:
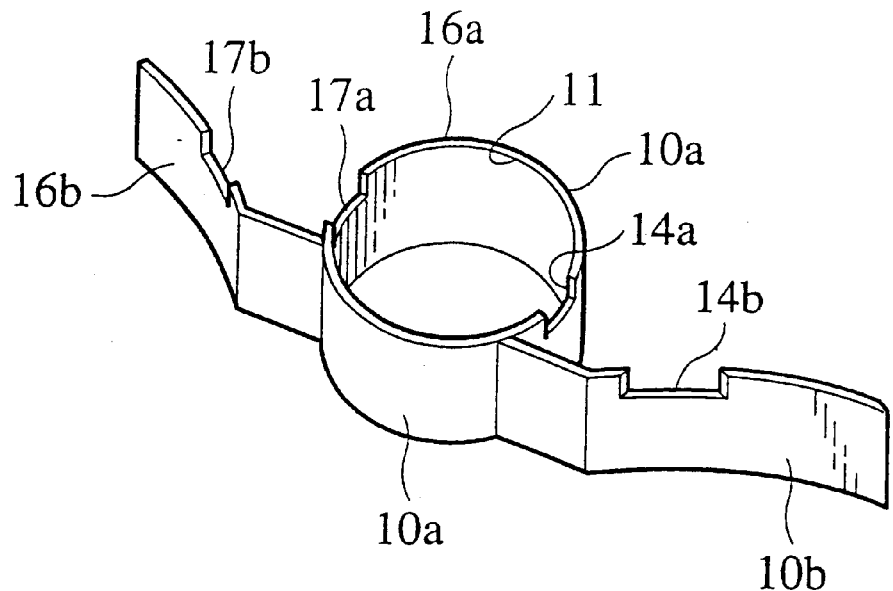
FIG. 3 shows prior art regarding the detection of a tape and is a perspective view of part S of FIG. 2.
Figure 4:
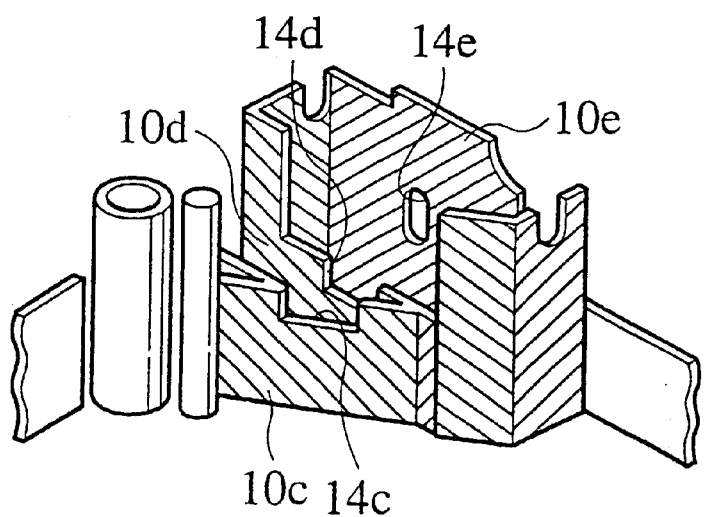
FIG. 4 shows prior art regarding the detection of a tape and is a perspective view of part E of FIG. 2.
Figure 5:
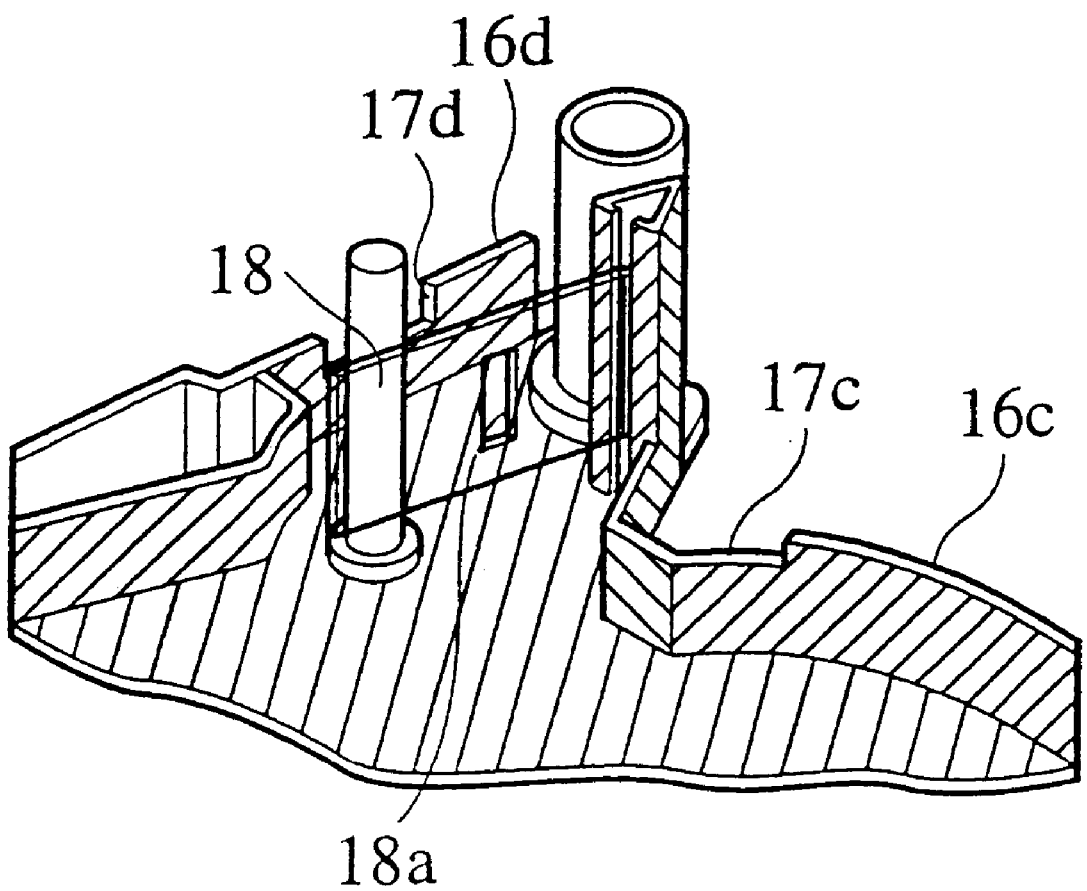
FIG. 5 shows prior art regarding the detection of a tape and is a perspective view of part F of FIG. 2.
Figure 6A:
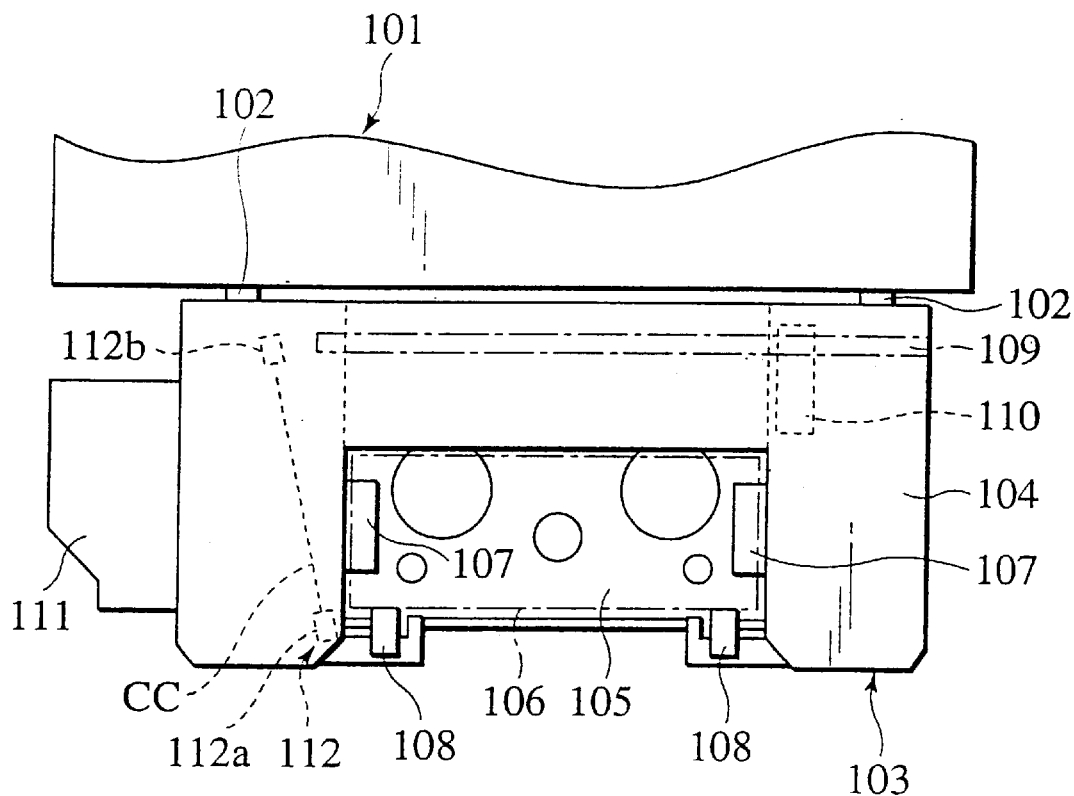
FIGS. 6A and 6B are a plan view and a front view, respectively showing a state in which a conventional cassette changer is used.
Figure 6B:
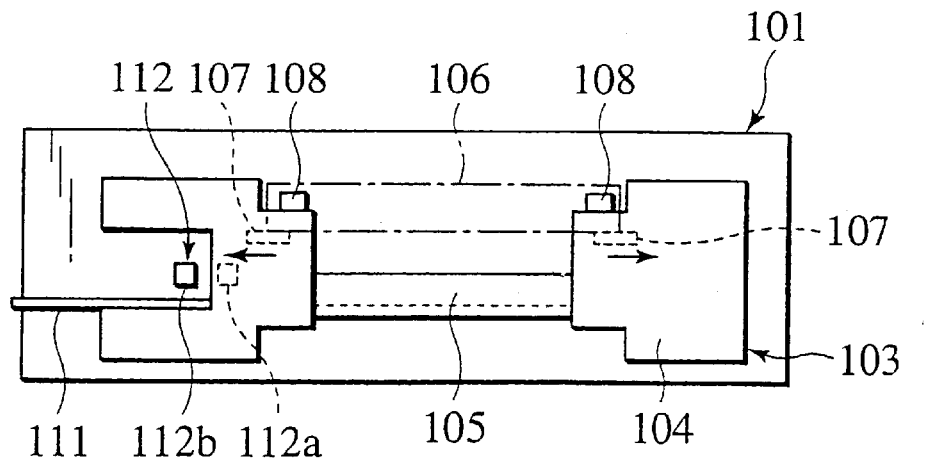
Figure 7A:
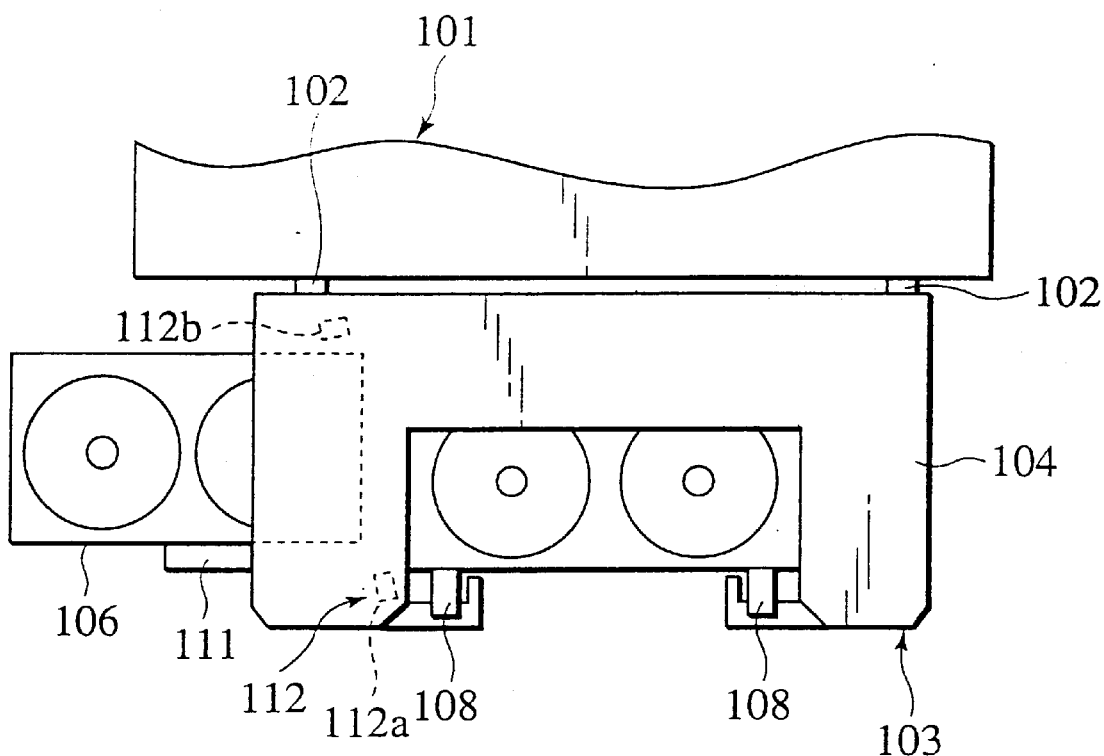
FIGS. 7A and 7B are a plan view and a front view, respectively showing a state in which a conventional cassette changer is used.
Figure 7B:
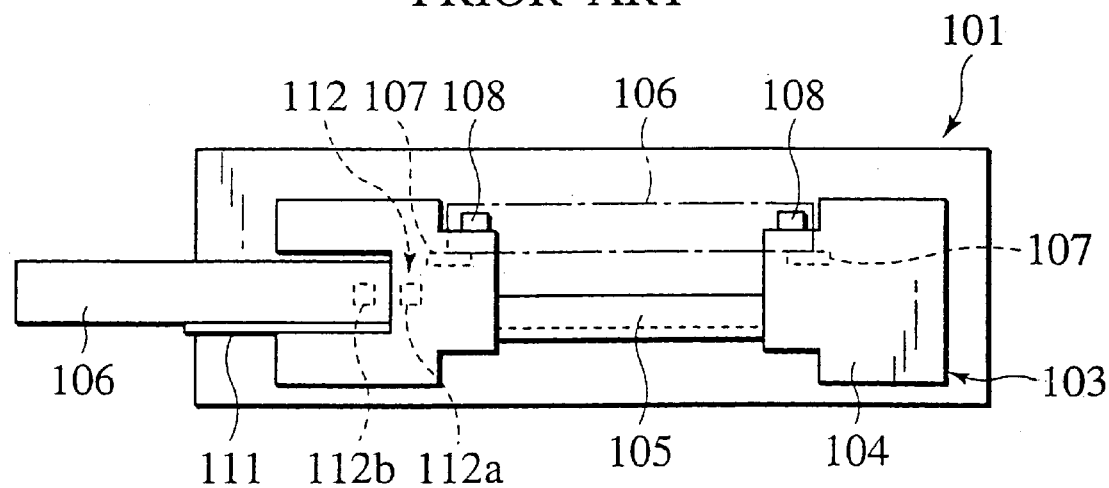
Figure 11:
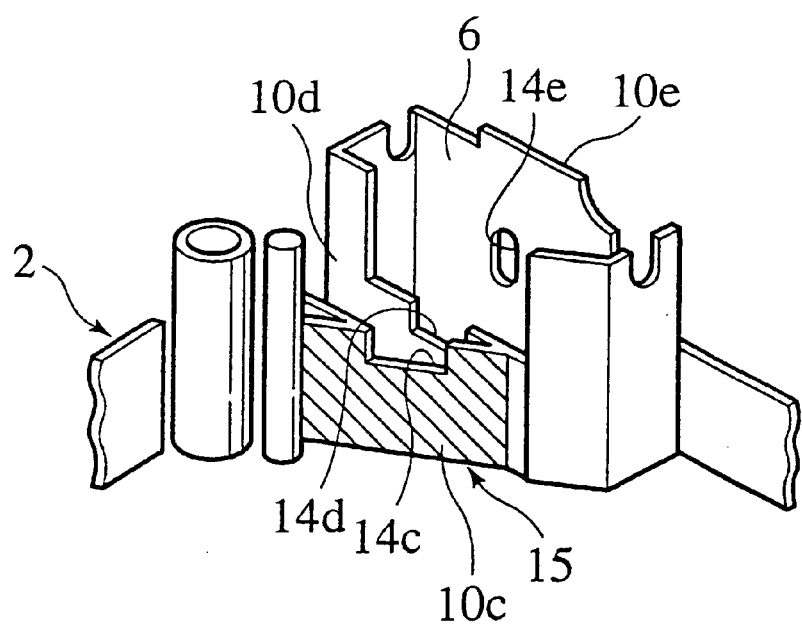
FIG. 11 is a perspective view of the important parts of a lower case portion in the third embodiment according to the present invention.

FIG. 11 is a perspective view of the important parts of a lower case portion 2 in the third embodiment of the present invention (corresponding to FIG. 8B). In the third embodiment shown in FIG. 1, a light shielding portion 15 is provided around a sensor optical path hole 14c right after light from a light emission element 12 comes out of a tape container 4. This light shielding portion 15 is constituted by forming a wall portion 10c itself out of a light shielding member with two colors in the formation of a cassette case 1. FIG. 11 shows that a light shielding material portion is indicated by hatching.

In the third embodiment as in the case of the first embodiment, it is possible to prevent malfunction in the detection of a tape end irrespectively of the characteristics (color, transparency and reflectance) of the cassette case 1. Besides, if the cassette case 1 itself is formed out of a high transparency material, a color originally intended for the cassette case 1 can be maintained as much as possible. Furthermore, since it suffices to form the wall portion 10c with two colors in the production of the tape cassette, production efficiency does not extremely deteriorate differently from the conventional tape cassette.

Figure 12:
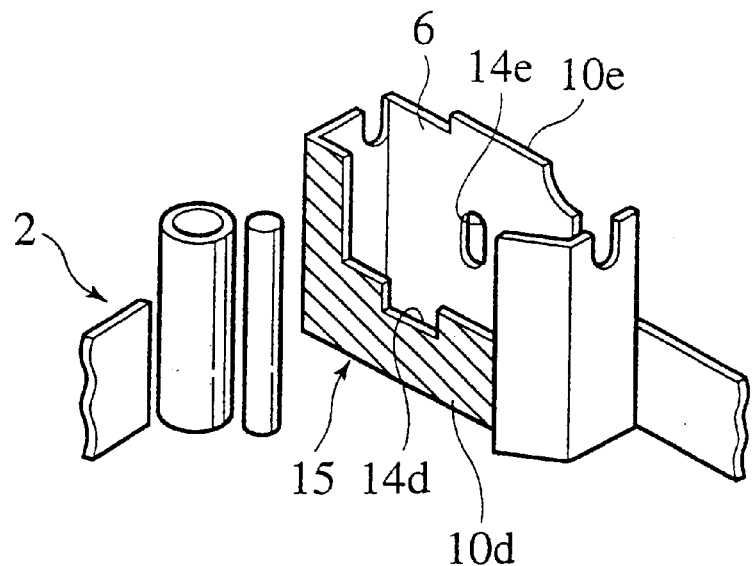
FIG. 12 is a perspective view of the important parts of a lower case portion in the fourth embodiment according to the present invention.

FIG. 12 is a perspective view of the important parts of a lower case portion 2 in the fourth embodiment of the present invention (corresponding to FIG. 8B). The fourth embodiment shown in FIG. 12 differs from the third embodiment in that not a wall portion right after light from a light emission element 12 comes out of the tape container 4 but the next wall portion 10d is colored with two colors. The remaining constituent elements are the same as those in the third embodiment, which description will not be, therefore, given herein.

It can be expected that the fourth embodiment provides the same function and advantages as those of the third embodiment.

As a modification of the third and fourth embodiments, the wall portion 10c right after light from the light emission element 12 comes out of the tape container 4 and the next wall portion 10d may be formed out of a light shielding material and to be colored with two colors. Since this modification can further enhance unnecessary light shielding effect, it is possible to further prevent malfunction in the detection of a tape end. Although the two portions are colored with two colors, this modification provides the same production efficiency as those of the third and fourth embodiments and is not disadvantageous over the third and fourth embodiments.

Figure 13:
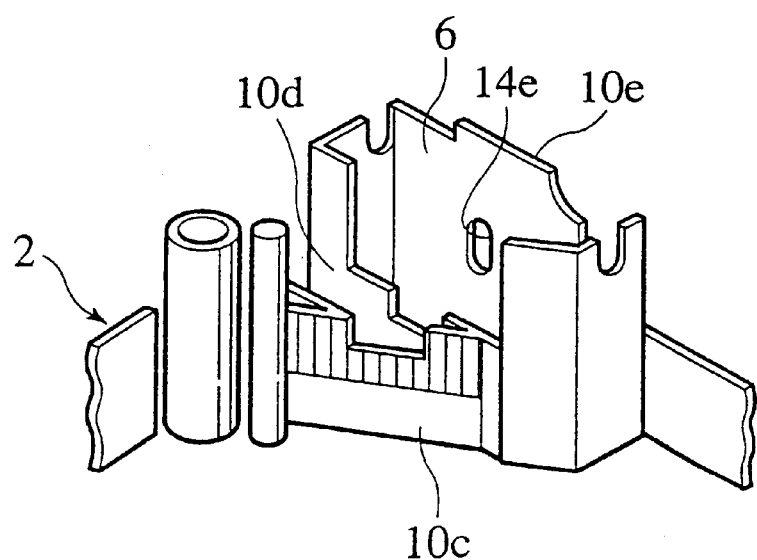
FIG. 13 is a perspective view of the important parts of a lower case portion in the fifth embodiment according to the present invention.
Figure 14:
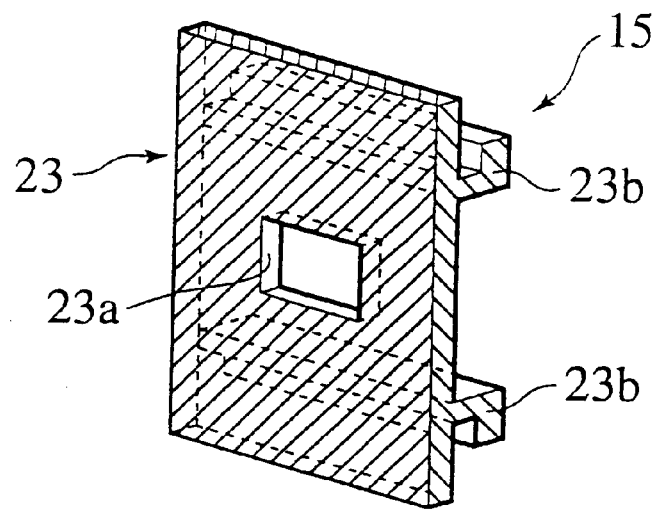
FIG. 14 show the fifth embodiment of the present invention and is a perspective view of a light shielding holder.

FIGS. 13 and 14 show the fifth embodiment according to the present invention. FIG. 13 is a perspective view of the important parts of a lower case portion 2 (corresponding to FIG. 8B) and FIG. 14 is a perspective view of a light shielding holder. In the fifth embodiment shown in FIG. 13, a light shielding portion 15 is provided on a wall portion 10c right after light from a light emission element 12 comes out of a tape container 4. The light shielding portion 15 is constituted by attaching the light shielding holder 23 shown in FIG. 14 to the wall portion 10c.

Namely, a sensor optical path hole like that in the wall portion 10c of the preceding embodiments is not provided but an area indicated by longitudinal hatching in FIG. 13 is notched. The light shielding holder 23 shown in FIG. 14 is attached to the wall portion 10c which is formed to be short, by stopping stopper pieces 23b at the wall portion 10c. The light shielding holder 23 is formed out of a light shielding material with a light shielding color. A sensor optical path hole 23a is provided in the light shielding holder 23 on a portion corresponding to the sensor optical path hole 14c and the paired stopper pieces 23b, 23b stopped at upper and lower wall portions 10c (an upper case portion side of which is not shown) are formed to protrude integrally with each other.

This fifth embodiment, as in the case of the first embodiment, can prevent malfunction in the detection of a tape end irrespectively of the characteristics (color, transparency and reflectance) of a cassette case 1. If the cassette case 1 itself is formed out of a high transparency material, a color originally intended for the cassette case 1 can be maintained as much as possible. Besides, since it suffices to attach the light shielding holder 23 to the wall portion 10c in the production of a tape cassette, production efficiency does not extremely deteriorate differently from the conventional tape cassette.

Figure 15:
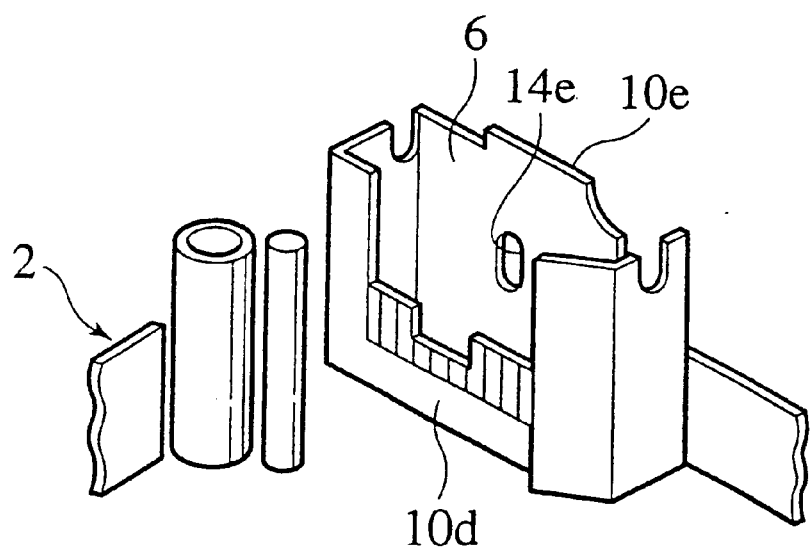
FIG. 15 shows the sixth embodiment of the present invention and is a perspective view of the important parts of a lower case portion.

FIG. 15, which shows the sixth embodiment according to the present invention, is a perspective view of the important parts of a lower case portion 2 (corresponding to FIG. 8B). In the sixth embodiment shown in FIG. 15, a light shielding portion 15 is provided on a wall portion 10d next to a portion right after light from a light emission element 12 comes out of a tape container 4. The light shielding portion 15 is constituted by attaching the light shielding holder 23 shown in FIG. 14 to the wall portion 10d. The specific constitution is the same as that of the fifth embodiment, which description will not be, therefore, given herein.

It can be expected that the sixth embodiment provides the same function and advantages as those of the fifth embodiment.

As a modification of the fifth and sixth embodiments, the light shielding holder 23 may be attached to the wall portion 10c right after light from the light emission element 12 comes out of the tape container 4 and to the next wall portion 10d. Since this modification can further enhance unnecessary light shielding effect, it is possible to further prevent malfunction in the detection of a tape end. In this modification, however, the light shielding holder 23 is attached to the two portions and is slightly disadvantageous in production efficiency. Nevertheless, it is sufficiently advantageous over the conventional cassette case.

Figure 16A:
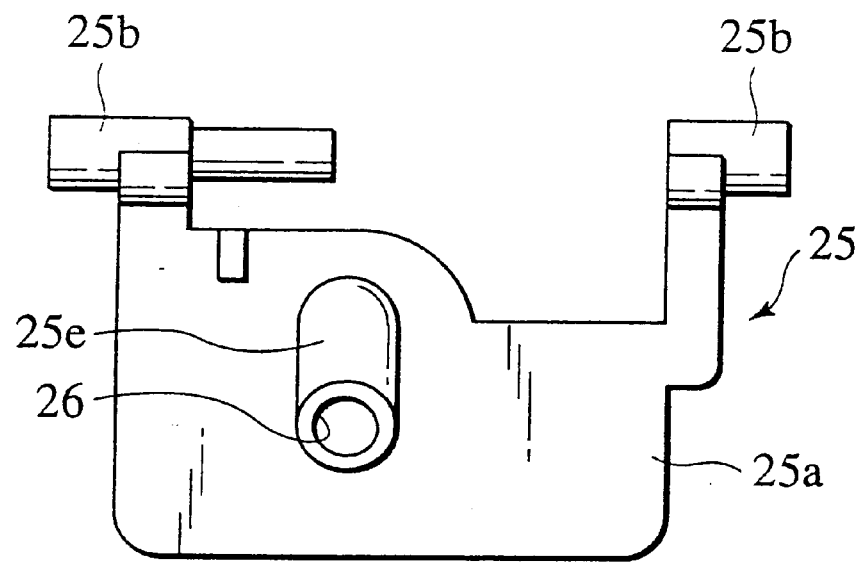
FIGS. 16A and 16B shows the seventh embodiment of the present invention and are a side view and a front view of a cover lock member, respectively.
Figure 16B:
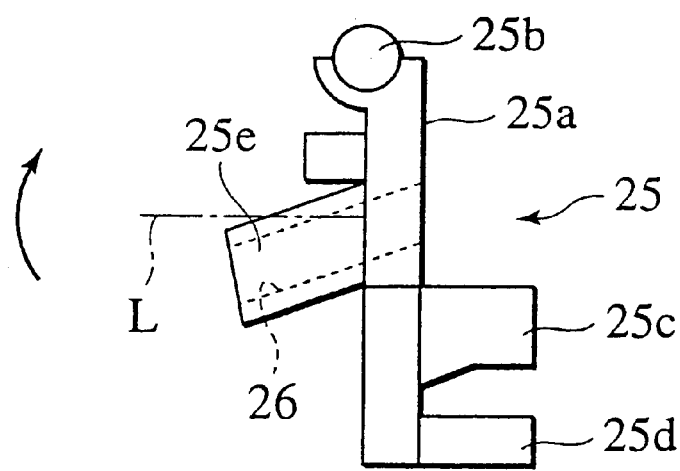

FIGS. 16A and 16B show the seventh embodiment according to the present invention. FIG. 16A is a side view of the cover lock member 25 and FIG. 16B is a front view of the cover lock member 25. The cover lock member 25 shown therein is arranged in a cover lock container 6 as shown in FIG. 8A. The cover lock member 25 is formed out of a light shielding material with a light shielding color and consists of a plate portion 25a, rotation support portions 25b fixed to the upper end of the plate portion 25a, respectively, a pressed portion 25c provided to protrude from the lower end of the plate portion 25a, a stopper claw 25d for stopping a cover (not shown) and a cylindrical protrusion 25e provided almost at the center of the plate portion 25a to protrude at the opposite side to the pressed portion 25c and the stopper claw 25d.

A sensor optical path hole 26 is provided in the cylindrical protrusion 25e. The sensor optical path hole 26 is preferably set longer as far as it does not interferes in the container 6. The cylindrical protrusion 25e is inclined downward at a cover locking position (which is a position shown in FIGS. 16A and 16B). If the pressed portion 25c is pressed in the course of the insertion of a cassette, the cylindrical protrusion 25e rotates with the rotation support portion 25b used as a fulcrum in an arrow direction in FIG. 16B and it is then put at an unlock position. At the unlock position, the cylindrical protrusion 25e is put horizontally and the sensor optical path hole 26 of the protrusion 25e is arranged on a straight line L1 coupling the position of the light emission element 12 with that of the light reception element 13a.

According to the seventh embodiment, light advancing straight to the light reception element 13a, among the light from the light emission element 12, enters the cover lock container 6 (shown in FIG. 8A) by way of the tape container 4 (shown in FIG. 8A) and the light is incident on the sensor optical path hole 26 of the cylindrical protrusion 25e. The incident light is emitted without abutting on the inner surface of the sensor optical path hole 26 and reaches the light reception element 13a by way of the sensor optical path hole 14e. Conversely, the above-stated unnecessary light does not normally advance straight to the light reception element 13a but is incident on the sensor optical path hole 26 of the cylindrical protrusion 25e, abutted on the inner surface of the sensor optical path hole 26 having a length M and shielded by the absorption effect of the hole 26. In the seventh embodiment, therefore, only the cover lock member 25 is worked, so that it is possible to prevent malfunction in the detection of a tape end irrespectively of the characteristics (color, transparency and reflectance) of the cassette case 1, to prevent the deterioration of production efficiency and to thereby respond to the demand of mass production. Besides, if the cassette case itself is formed out of a high transparency material, a color originally intended for the cassette case 1 can be maintained.

While the seventh embodiment is advantageous if utilized solely as stated above, it is also possible to combine the seventh embodiment with the first to sixth embodiments. By combining so, the advantage of preventing malfunction further enhances.

In the seventh embodiment, the cover lock member 25 itself is formed out of a light shielding material with a light shielding color. It is also possible to form only the cylindrical protrusion 25e out of a light shielding material with a light shielding color. It is noted, however, that the light among the unnecessary light which abuts on the plate portion 25a and the like of the cover lock member 25 can be shielded by the absorption effect of the cover lock member 25 if the member 25 itself is formed out of a light shielding material with a light shielding color and the unnecessary light shielding effect enhances. Thus, it is preferable that the cover lock member 25 itself is formed out of a light shielding material with a light shielding color.

Figure 17A:
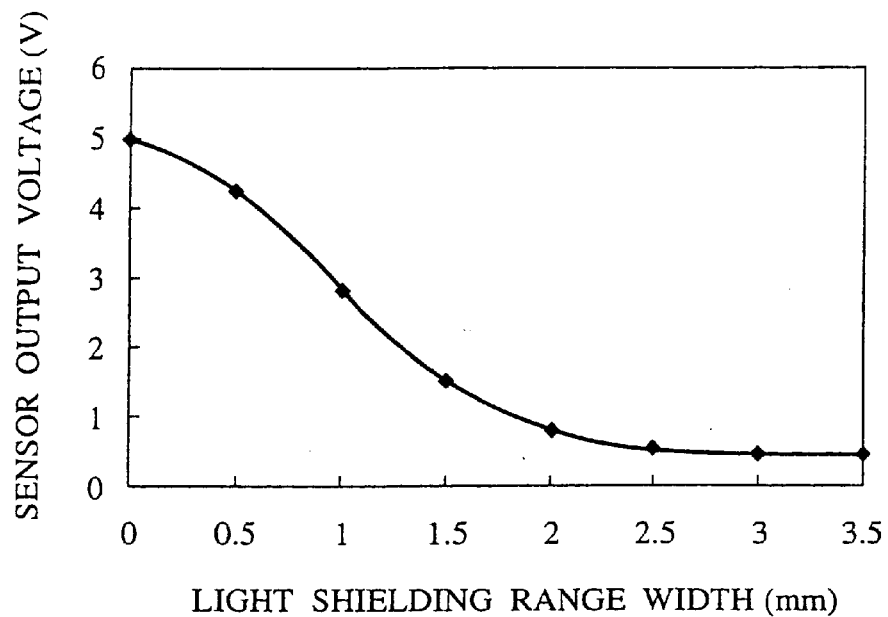
FIG. 17A is a sensor output characteristic view while the white (transparent) cassette case is used and the right and left widths (light shielding range widths) of the light shielding portion are changed in the first to sixth embodiments.
Figure 17B:
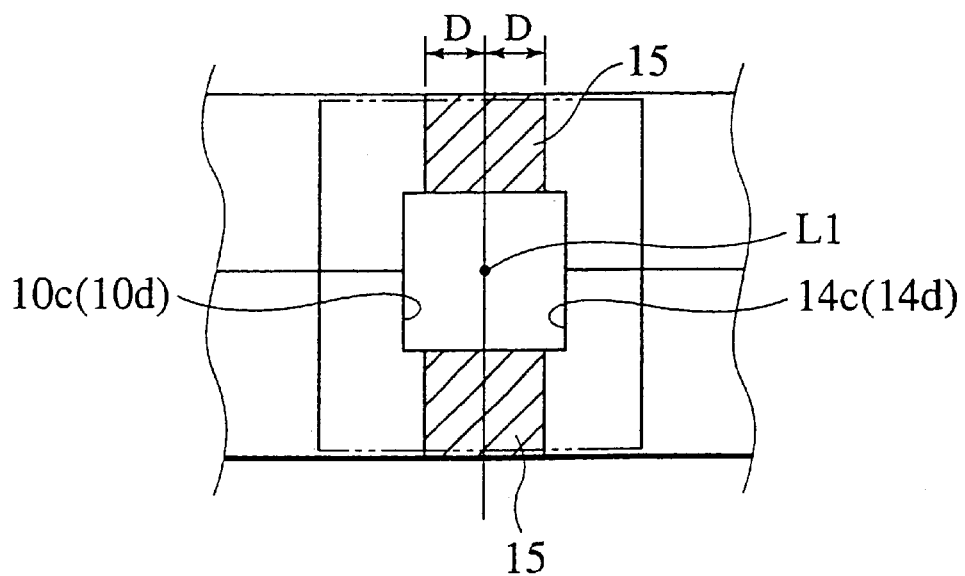
FIG. 17B shows the right and left widths (light shielding range widths) of the light shielding portion.

FIG. 17A is a sensor output characteristic chart while colorlessness (transparency) is used as the color of the cassette case 1 and each of the right and left widths (light shielding range widths) D of the light shielding portion is changed in the first to sixth embodiments. FIG. 17B shows each of the right and left widths (light shielding range widths) D of the light shielding portion. It is noted that the virtual line of FIG. 17B indicates the region of the light shielding portion 15 in the first to sixth embodiments. Here, although already explained above, the right and left widths D of the light shielding portion 15 mean right and left widths from the center of an optical path coupling the position of the light emission element 12 with that of the light reception element 13a by a straight line L1. If the width D is set at not less than 1 mm, desired light shielding effect can be obtained, which will be described hereinafter.

In the detection of a tape end, it is assumed that a threshold value is around 3V and the sensor malfunctions if a sensor output voltage is not less than 3V even in a state in which a magnetic recording layer tape part is to be detected, and the sensor normally functions if the sensor output voltage is not more than 3V.

As shown in FIG. 17A, if a light shielding range width is zero, i.e., the light shielding portion 15 is not at all provided around the sensor optical path hole 14c (or 14d), the sensor output voltage is 5V and the sensor malfunctions. If the light shielding portion 15 is provided around the sensor optical path hole 14c (or 14d) and the width D is gradually increased, the sensor output voltage has a gradual decrease. If each of the right and left widths D of the light shielding portion 15 becomes about 1 mm, the sensor output voltage is not more than 3V. If the width D is not less than 2 mm, the sensor output voltage drops down to not more than 1V. This is because unnecessary light is shielded by the shielding portion 15 and thereby the quantity of the unnecessary light which reaches the light reception element 13a decreases. This demonstrates that the quantity of the unnecessary light which reaches the light reception element 13a largely depends on the right and left widths D of the light shielding portion 15.

The unnecessary light which reach the light reception element 13a include upper and lower reflected lights reflected by the flange 5a of the reel 5 or the like and right and left reflected lights reflected by the wall portions of the cassette case 1. The upper and lower reflected lights highly likely reach the light reception element 13a but are shielded by the shielding portion 15. This follows that even if the entire periphery of the sensor optical path hole 14c (or 14d) is not shielded, unnecessary light can be effectively shielded.

As can be understood from the above and as show in FIG. 17A, even if the lateral side of the sensor optical path hole 14c (or 14d) is not shielded, a sensor output of not more than 3V can be held and there is less possibility of malfunction by setting the respective left and right widths D of the shielding portion 15 at not less than 1 mm.

FIG. 18 shows a list of malfunction evaluation results of the first and second embodiments and their comparison examples. A comparison example 1 is a case where a light shielding portion is provided around the sensor optical path hole 14a of the wall portion 10a before light from the light emission element 12 is incident on the tape container 4. A comparison example 2 is a case where a light shielding portion is provided around the sensor optical path hole 14b of the wall portion 10b before light from the light emission element is incident on the tape container 4. A comparison example 3 is a case where a light shielding portion is provided around the sensor optical path hole 14e of the last wall portion 10e after light from the light emission element 12 comes out of the tape container 4.

In a sample A, the color of the cassette case is colorless (transparent). In a sample B, the color of the cassette case is smoke (translucent). In a sample C, the color of the cassette case is red (non-transparent). In a sample D, the color of the cassette case is black (non-transparent). As a measurement equipment, a commercially available VTR was used.

The symbols of the evaluation results mean as follows. Symbol ○ means that the sensor normally functions with the commercially available VTR; symbol Δ means that the detection voltage of the sensor is high and the sensor sometimes malfunction with the commercially available VTR; symbol X means that the sensor always malfunctions with the commercially available VTR. As can be seen from FIG. 18, the embodiments of the present invention can prevent the sensor from malfunctioning in the detection of a tape end irrespectively of the characteristics (color, transparency and reflectance) of the cassette case 1.

Figure 19:
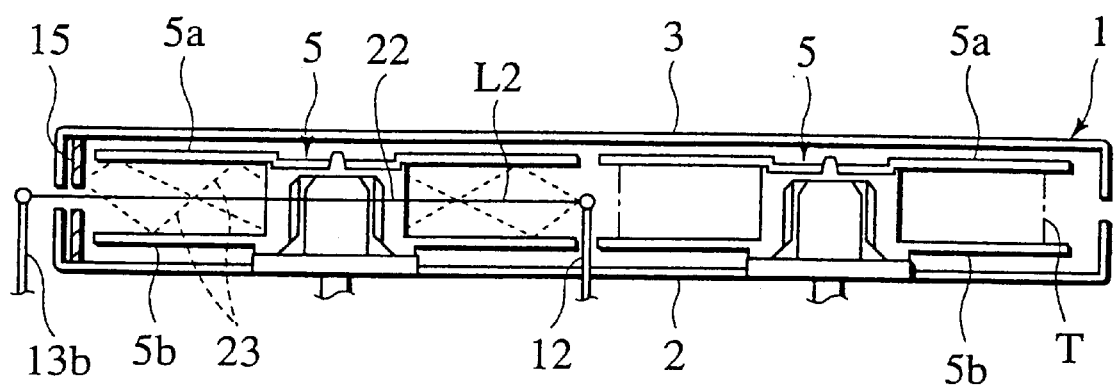
FIG. 19 shows the eighth embodiment of the present invention and is a schematic cross-sectional view of a tape cassette.
Figure 20:
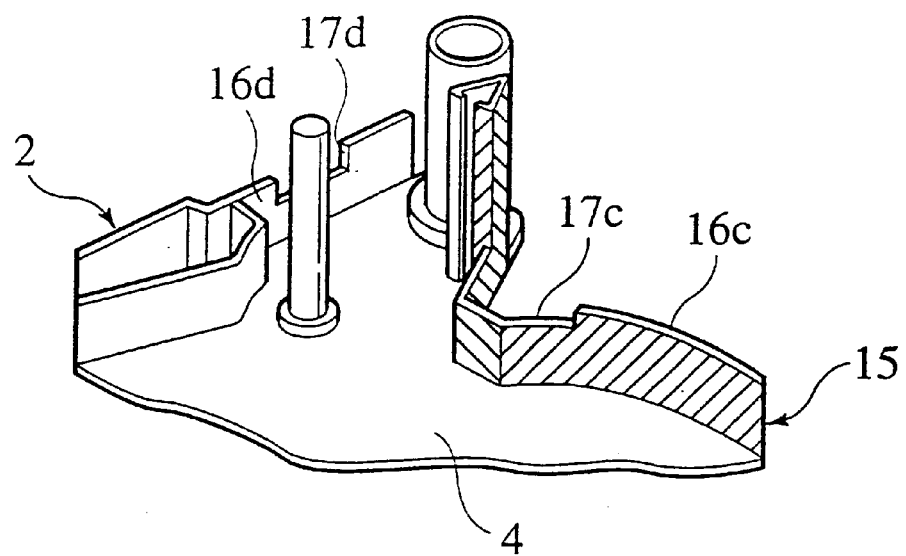
FIG. 20 shows the eighth embodiment of the present invention and is a perspective view of the important parts (corresponding to part F of FIG. 8A) of a lower case portion.

FIGS. 19 and 20 show the eighth embodiment according to the present invention. FIG. 19 is a schematically longitudinal sectional view of a tape cassette and FIG. 20 is a perspective view of the important parts of a lower case portion (corresponding to part F in FIG. 8A). The eighth embodiment will be compared with the conventional case. It is noted that the same constituent elements as those in the conventional case will not be described herein to avoid repetitive description and only different constituent elements will be described with reference to FIGS. 19 and 20.

Namely, in the eighth embodiment, a portion close to a light reception element 13b is not colored with a low reflectance color unlike the conventional tape cassette. As shown in FIG. 20, a light shielding portion 15 is provided around the sensor optical path hole 17c of a wall portion 16c right after light from a light emission element 12 comes out of a tape container 4 at a left side (supply side). The light shielding portion 15 is constituted by bonding a light shielding member formed out of a light shielding material to be colored with a light shielding color to the wall portion as in the case of the first embodiment, forming the wall portion 16c itself out of a light shielding material to be colored with two colors in the production of the cassette case 1 as in the case of the third embodiment or attaching a light shielding holder to the wall portion 16c as in the case of the fifth embodiment.

In the detection of a tape end at the supply side, the light shielding portion 15 is provided to have right and left widths each of not less than about 1 mm from the center of an optical path coupling the position of the light emission element 12 with that of the light reception element 13b by a straight line L2 and to spread over the entire height of the wall portion 16c. This is true for the following ninth, tenth and twelfth embodiments. The reason for setting the right and left widths at not less than about 1 mm is the same as that already described above.

With the above-stated constitution, light 22 advancing straight to the light reception element 13b, among the light from the light emission element 12, reaches a tape traveling path by way of sensor optical path holes 17a and 17b. If a tape T on the tape traveling path is a magnetic recording layer tape part, it does not transmit light and the light does not, therefore, reach the light reception element 13b. If the tape T on the tape traveling path is a high light transparency leader tape part, it transmits light and the light reaches the light reception element 13b by way of the sensor optical path holes 17c, 18a and 17d.

Further, among light from the light emission element 12, unnecessary light 23 which does not advance straight to the light reception element 13b and unnecessary light 23 incident into the cassette case 1 from a window or the like on the upper surface of the tape container 4 of the tape cassette may be reflected by the upper and lower flanges 5a and 5b of a reel 5, the inner surface of the cassette case 1 and the like and directed toward the light reception element 13b without passing the tape traveling path. Since most of the unnecessary light 23 which may possibly reach the light reception element 13b is abutted against the light shielding portion 15 and then shielded by the portion 15, the ratio of the unnecessary light which reaches the light reception element 13b is very low.

Accordingly, it is possible to prevent malfunction in the detection of a tape end irrespectively of the characteristics (color, transparency and reflectance) of the cassette case. It suffices to simply bond a light shielding member to the wall portion 16c in the production of a tape cassette, to form the wall portion 16c to be colored with two colors in the production of a tape cassette or to attach the light shielding holder to the wall portion 16c. Unlike the conventional tape cassette, therefore, production efficiency does not deteriorate greatly. Furthermore, it suffices to bond the light shielding member 20 to only one wall portion 10c which is not on the outer surface of the cassette case 1, to form the wall portion 16c to be colored with two colors in the production of a tape cassette or to attach the light shielding holder to the wall portion 16c. Therefore, if the cassette case itself is made of a high transparency material, a color originally intended for the cassette case 1 can be maintained as much as possible.

Figure 21:
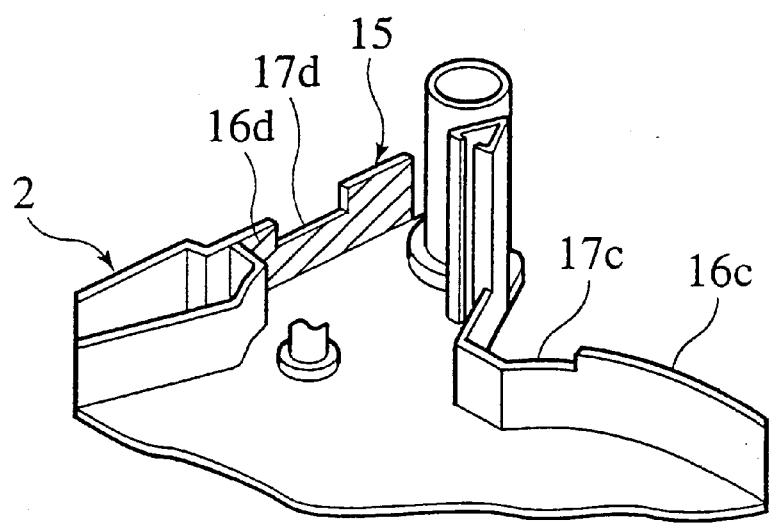
FIG. 21 shows the ninth embodiment of the present invention and is a perspective view of the important parts of the lower case portion.

FIG. 21 is a perspective view of the important parts of the lower case portion 2 in the ninth embodiment according to the present invention. In the ninth embodiment, a light shielding portion 15 is provided not to a portion just after light from a light emission element 12 comes out of a tape container 4 at a left side (supply side) but provided around the sensor optical path hole 17d of the next wall portion 16d. The light shielding portion 15 is the same in constitution as that in the eighth embodiment.

It can be expected that the ninth embodiment provides the same function and advantages as those of the eighth embodiment.

As a modification of the eighth and ninth embodiments, the light shielding member 20 may be bonded around the sensor optical path hole 17c right after light from the light emission element 12 comes out of the tape container 4 and the next sensor optical path hole 17d. Since this modification can further enhance unnecessary light shielding effect, it is possible to further prevent malfunction in detecting a tape end. In this case, however, the light shielding portion 15 is provided with the two portions and is slightly disadvantageous in production efficiency. Nevertheless, the production efficiency of this modification is sufficiently advantageous over the conventional cassette case.

Figure 22:
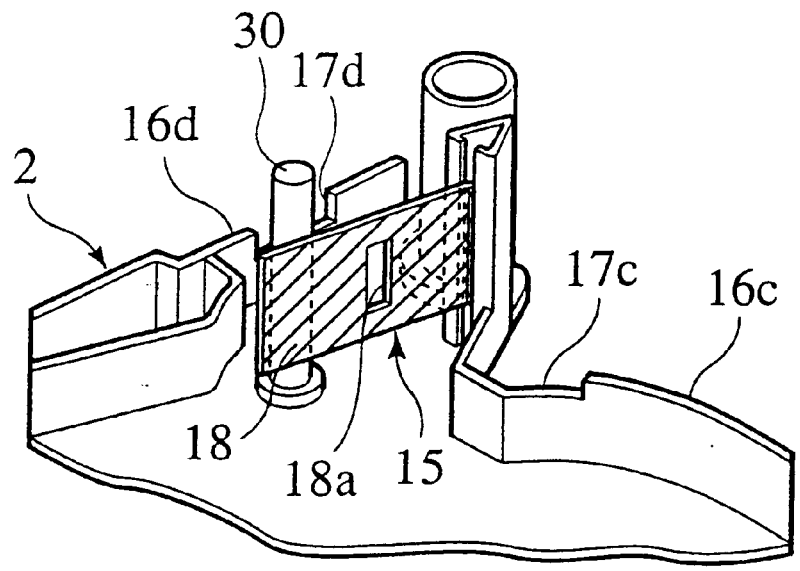
FIG. 22 shows the tenth embodiment of the present invention and is a perspective view of the important parts of the lower case portion.
Figure 23:
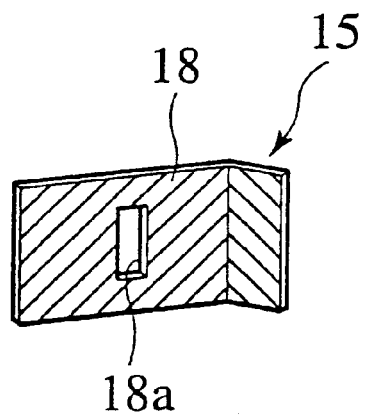
FIG. 23 shows the tenth embodiment of the present invention and is a perspective view of a tape pad.

FIGS. 22 and 23 show the tenth embodiment according to the present invention. FIG. 22 is a perspective view of the important parts of a lower case 2 and FIG. 23 is a perspective view of a tape pad. In the tenth embodiment shown in FIGS. 22 and 23, the tape pad 18 itself, arranged between the sensor optical path hole 17c of a wall portion 16c right after light from a light emission element 12 comes out of a tape container 4 and the sensor optical path hole 17d of the next wall portion 16d, is constituted as a light shielding portion 15. Namely, while the tape pad is formed out of a transparent member in the conventional tape cassette, the tape pad 18 is formed out of a light shielding material with a light shielding color in this embodiment and serves as the light shielding portion 15. In FIG. 22, reference symbol 30 denotes a tape guide. The tape pad 18 is arranged between the tape guide 30 and the wall portion 16c for the purpose of preventing a tape from loosening.

It can be expected that the tenth embodiment provides the same function and advantages as those of the preceding eighth and ninth embodiments. Further, in the tenth embodiment, it suffices to conduct a step of assembling the tape pad 18 which is naturally necessary. Thus, compared with the conventional tape cassette, production efficiency enhances.

Figure 24:
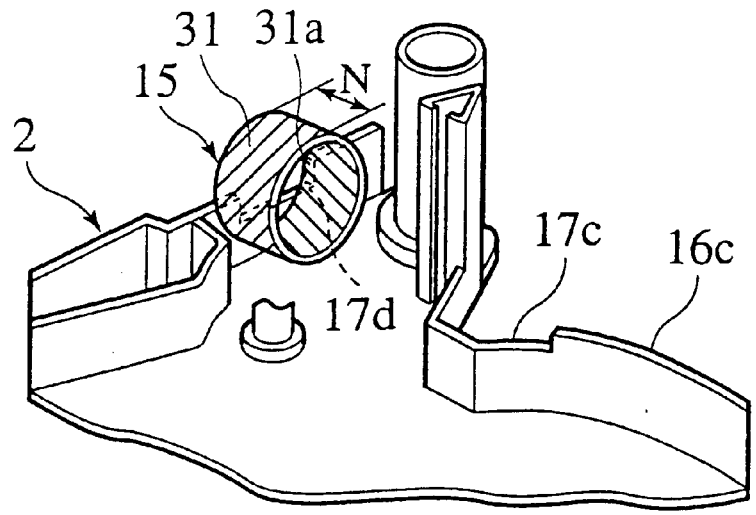
FIG. 24 shows the eleventh embodiment of the present invention and is a perspective view of the important parts of the lower case portion.

FIG. 24 is a perspective view of the important parts of a case portion 2 in the eleventh embodiment according to the present invention. In the eleventh embodiment shown in FIG. 24, a cylindrical light shielding member 31 serving as a light shielding portion 15 is provided between the sensor optical path hole 17c of a wall portion 16c right after light from a light emission element 12 comes out of a tape container 4 at a left side (supply side) and the sensor optical path hole 17d of the next wall portion 16d and at a position at which the traveling of a tape is not obstructed. The cylindrical light shielding member 31 is formed out of a light shielding material with a light shielding color and includes therein a sensor optical path hole 31a of a length N.

The sensor optical path hole 31a of the cylindrical light shielding member 31 is preferably set longer as far as it does not obstruct the traveling of the tape. The center of the sensor optical path hole 31a is arranged on a straight line L2 coupling the position of the light emission element 12 with that of the light reception element 13b. Further, the diameter of the sensor optical path hole 31a is set to be at least the same as that of the optical path holes 17a to 17d.

It can be expected that the eleventh embodiment provides the same function and advantages as those of the seventh embodiment. Namely, unnecessary light does not normally advance straight to the light reception element 13b but is incident on the sensor optical path hole 31a of the cylindrical light shielding member 31, abutted on the inner surface of the hole 31a with the length N and shielded by the absorption effect of the member 31. According to the eleventh embodiment, therefore, it is possible to prevent malfunction in the detection of a tape end only by adding the cylindrical light shielding member 31 irrespectively of the characteristics (color, transparency and reflectance) of the cassette case 1. Besides, if the cassette case 1 itself is formed out of a high transparency material, a color originally intended for the cassette case 1 can be maintained.

Figure 25:
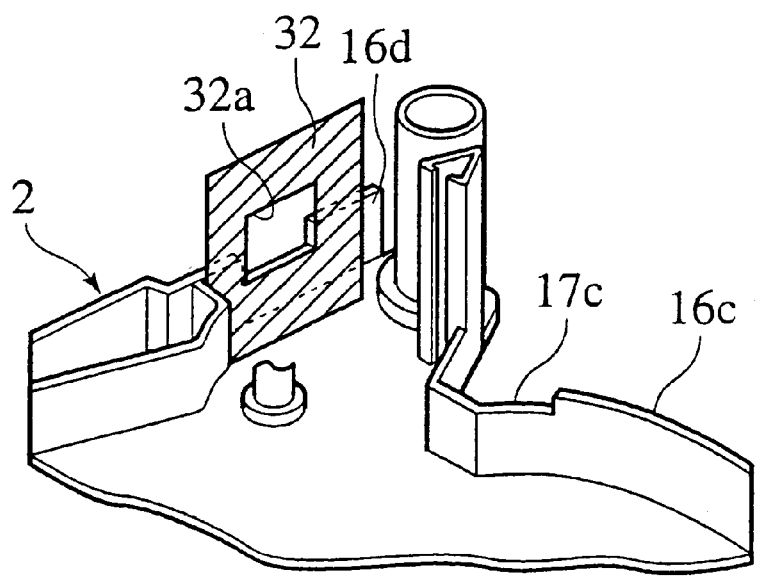
FIG. 25 shows the twelfth embodiment of the present invention and is a perspective view of the important parts of the lower case portion.

FIG. 25 is a perspective view of the important parts of a case portion 2 in the twelfth embodiment according to the present invention. In the twelfth embodiment shown in FIG. 25 as in the case of the eleventh embodiment, a light shielding wall portion 32 is newly provided between the sensor optical path hole 17c of a wall portion 16c right after light from a light emission element 12 comes out of a tape container 4 at a left side (supply side) and the sensor optical path hole 17d of the next wall portion 16d and at a position at which the traveling of a tape is not obstructed. The light shielding wall portion 32 is formed out of a light shielding material with a light shielding color. A sensor optical path hole 32a is formed in the light shielding wall portion 32. The center of the sensor optical path hole 32a is arranged on a straight line L2 coupling the position of the light emission element 12 with that of the light reception element 13b. Further, the size of the sensor optical path hole 32a is set to be the same as at least that of the sensor optical path holes 17a to 17d. This light shielding portion 32 is constituted by separately attaching the portion 32 to the cassette case after the cassette case has been manufactured or by forming the portion to be colored with two colors in the production of the cassette case.

It can be expected that the twelfth embodiment provides the same light shielding effect as those of the eighth and ninth embodiments.

While the eleventh or twelfth embodiment provides advantages if used solely as stated above, it is also possible to combine it with the eighth to tenth embodiments. By combining so, the advantage of preventing malfunction further enhances.

FIG. 26 shows a list of malfunction evaluation results of the eighth to eleventh embodiments and their comparison examples. A comparison example 4 is a case where a light shielding portion is provided around the sensor optical path hole 17a of a wall portion 16a just before light from a light emission element 12 is incident on a tape container 4. A comparison example 5 is a case where a light shielding portion is provided around the sensor optical path hole 17b of a wall portion 16b just before light from the light emission element 12 is incident on a tape container 4. A comparison example 6 is a case where no light shielding measures are taken.

In a sample A, the color of the cassette case is colorless (transparent). In a sample B, the color of the cassette case is smoke (translucent). In a sample C, the color of the cassette case is red (non-transparent). In a sample D, the color of the cassette case is black (non-transparent). As a measurement equipment, a commercially available VTR was employed.

The symbols of the evaluation results mean as follows. Symbol ○ means that the sensor normally functions with the commercially available VTR. Symbol X means that the sensor always malfunctions with the commercially available VTR. As can be understood from FIG. 26, the embodiments of the present invention can prevent the sensor from malfunctioning in the detection of a tape end irrespectively of the characteristics (color, transparency and reflectance) of the cassette case 1.

Figure 27:
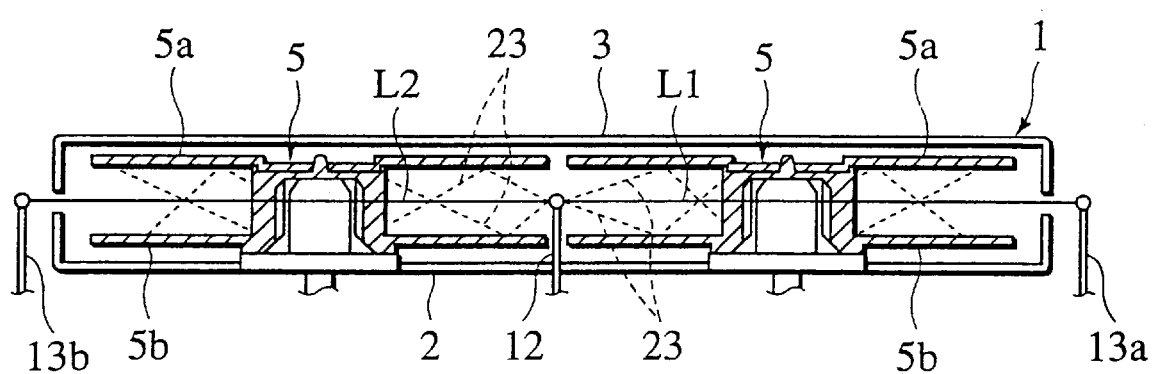
FIG. 27 shows the thirteenth embodiment of the present invention and is a schematically cross-sectional view of a tape cassette.

FIG. 27 is a schematically longitudinal sectional view in the thirteenth embodiment according to the present invention. In the thirteenth embodiment shown in FIG. 27, both an upper flange 5a and a lower flange 5b of each of a pair of reels 5, 5 are formed out of a material attenuating a reflected light with a color (e.g., black) attenuating reflected light. In FIG. 27, the upper flange 5a and the lower flange 5b of the respective paired reels 5, 5 are indicated by hatching.

According to the thirteenth embodiment, unnecessary light 23 which does not advance straight to a light reception element 13b and unnecessary light 23 which is incident into a cassette case 1 from a window and the like on the upper surface of the tape container 4 of the tape cassette, among the light from a light emission element 12, are abutted on the inner surfaces of the upper and lower flanges 5a and 5b of the reels 5 and the reflected light is attenuated, i.e., shielded by the absorption effect of the flanges. Therefore, according to the thirteenth embodiment, it is possible to prevent malfunction in the detection of the tape end only by installing the reels 5 subjected to light shielding processing irrespectively of the characteristics (color, transparency and reflectance) of the cassette case 1. Besides, production efficiency does not deteriorate and it is, therefore, possible to deal with the demand of mass production. Moreover, if the cassette case 1 itself is formed out of a high transparency material, a color originally intended for the cassette case 1 can be maintained.

While both of the paired reels 5, 5 are subjected to light shielding processing in the thirteenth embodiment, only one of the right side (take-up side) and the left side (supply side) of the reels may be subjected thereto. Further, while both the upper flange 5a and the lower flange 5b of each of the paired reels 5 are subjected to light shielding processing in the thirteenth embodiment, only one of the upper flange 5a and the lower flange 5b may be subjected thereto.

While the thirteenth embodiment provides advantages if used solely as stated above, it is also possible to combine the thirteenth embodiment with the preceding first to seventh embodiments or eighth to twelfth embodiments. By combining so, the advantage of preventing malfunction further enhances.

While the constitutions of the tape cassette regarding the detection of a tape end at the take-up side in the first to seventh embodiments do not show the light shielding means disclosed by the eleventh and twelfth embodiments, the light shielding means disclosed by the eleventh and twelfth embodiments can be also applied to the take-up side.

(Tape Cassette in Embodiments Regarding the Presence/Absence of the Tape Cassette)

Figure 29:
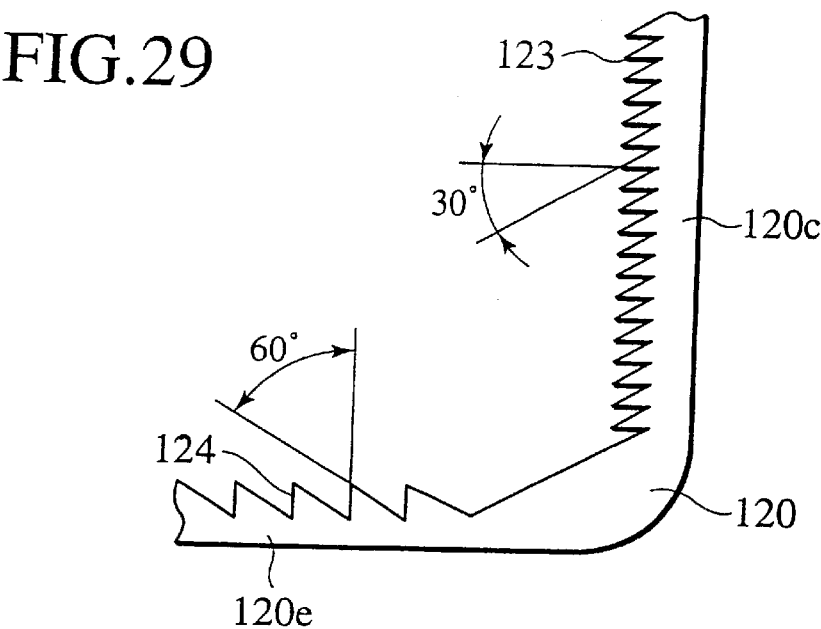
FIG. 29 shows the fourteenth embodiment of the present invention and shows the part of MM of FIG. 28A in partial enlargement view.
Figure 30:
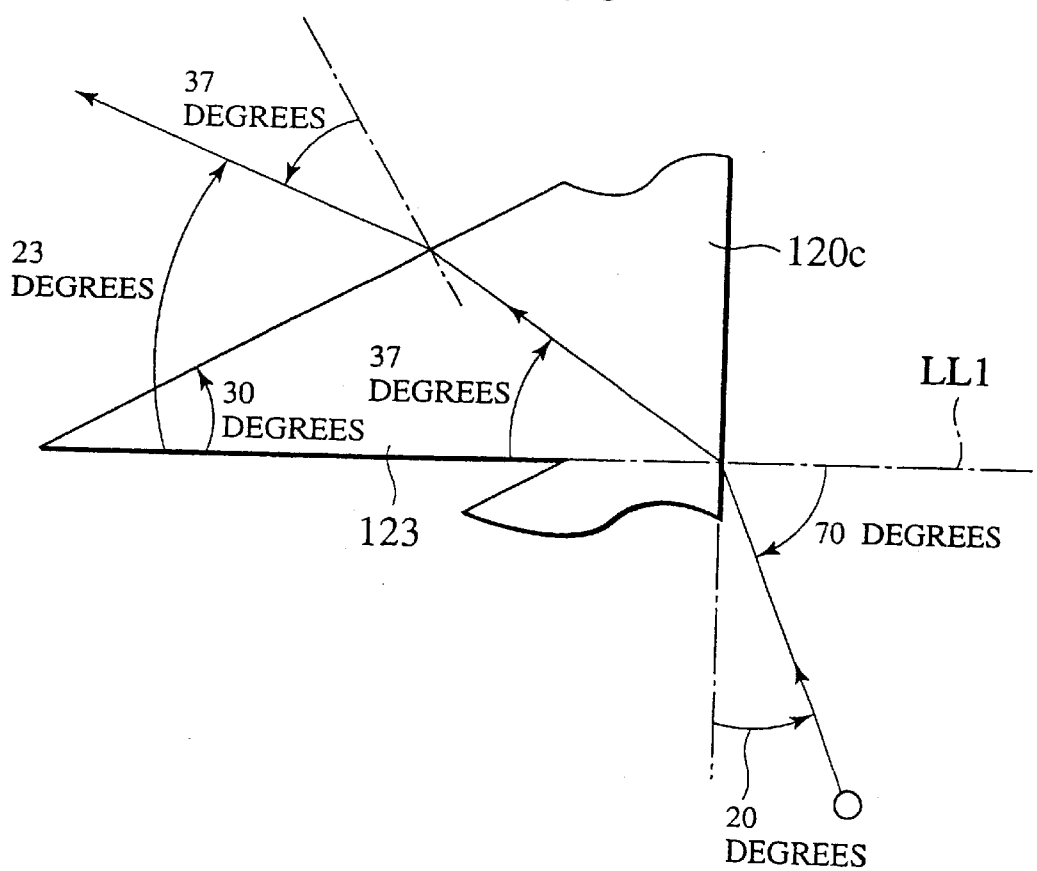
FIG. 30 shows the fourteenth embodiment of the present invention and shows the optical path of detection light incident on the prism portion on the side surface portion.
Figure 31:
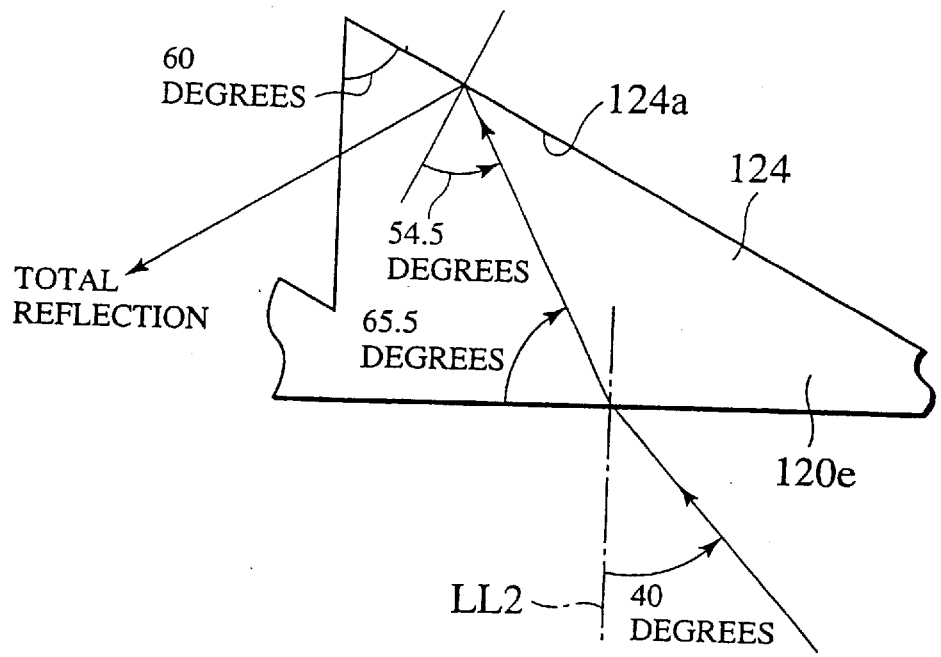
FIG. 31 shows the fourteenth embodiment of the present invention and shows the optical path of detection light incident on the prism portion on the back surface portion.

FIGS. 28 to 31 show the fourteenth embodiment according to the present invention. Specifically, FIG. 28A is a plan view of a tape cassette from which only the upper portion of a cassette case is removed; FIG. 28B is a back view of the tape cassette; FIG. 28C is a side view of the tape cassette; FIG. 29 is a partial enlargement view of part MM of FIG. 28A; FIG. 30 shows the optical path of detected light incident on a prism portion on the side surface of the tape cassette; and FIG. 31 shows the optical path of detected light incident on a prism portion on the back surface thereof.

With reference to FIGS. 28A to 28C, description will be given to the cassette presence detection means 112 at the side of an apparatus (a recording and reproducing apparatus, a cassette changer or the like) in which the tape cassette TTC in the fourteenth embodiment is used. The cassette presence detection means 112 includes a light emission portion 112a provided at the apparatus side and a light reception portion 112b for receiving detected light from the light emission portion 112a. The cassette presence detection means 112 is set so that the optical path CC1 (the center of which is shown therein) of detection light reaching the light reception portion 112b from the light emission portion 112a passes a cassette position by going from the side surface side of the tape cassette TTC through the front surface side thereof. To be exact, the detection light is emitted from the light emission portion 112a at a light emission angle of about 30 degrees (15 degrees at one side).

Meanwhile, the cassette case 120 of the tape cassette TTC has a generally flat, rectangular parallelopiped shape consisting of an upper surface portion 120a, a bottom portion 120b, a pair of right and left side surface portions 120c, a front surface portion 120d and a back surface portion 120e. The cassette case 120 is made of a high transparency material (e.g., polystyrene). A partition wall 122 is provided in the cassette case 120 to form a pair of tape containers 121, 121 and a pair of wound tapes (not shown) are rotatably contained in the paired containers 121, 121 respectively.

Prism portions 123 and 124 are provided on a portion of the cassette case 120 which portion corresponds to that on the optical path CC1 of the detected light and on which portion the detection light emitted from the light emission portion 112a is first incident, or to be specific, on part of the side surface portion 120c and the back surface portion 120e adjacent the side surface portion 120c, respectively (FIG. 28A shows an area in which the prism portions 123 and 124 are provided is indicated by hatching).

The prism portions 123 and 124 on the side surface portion 120c and the back surface portion 120e, respectively, are formed continuously in parallel as shown in FIG. 29. They are formed simultaneously with the formation of the cassette case 120 in an integral fashion. The prism portion 123 on the side surface portion 120c is formed to have a vertical angle of 30 degrees, whereas the prism portion 124 on the back surface portion 120e is formed to have a vertical angle of 60 degrees.

With the above-stated constitution, if the tape cassette TTC is put at the cassette position of the apparatus, the detection light from the light emission portion 112a is applied thereto about the optical path CC1. As shown in FIG. 30, this detection light is incident on the side surface portion 120c at the center of an incident angle of almost 70 degrees (an angle with respect to an incident normal LL1) and emitted at an emission angle of 23 degrees with respect to the incident normal LL1 by the refraction of the prism portion 123. Accordingly, the detection light is emitted in a direction largely deviated from the optical path CC1 of the incident light. The angle of deviation of the prism portion 123 (difference between the incident angle and the emission angle) is 47 degrees.

As shown in FIG. 31, the detection light is incident on the back surface portion 120e of the tape cassette TTC at the center of the incident angle of almost 40 degrees (an angle with respect to an incident normal LL2) and emitted to the emission surface 124a of the prism portion 124 at a projection angle of 54.5 degrees. Since the critical angle of the prism portion 124 is almost 40 degrees, the detection light is, therefore, totally reflected. Accordingly, the detection light is emitted in a direction largely deviated from the optical path CC1 of the incidence light. As can be seen from the above, the detection light applied to the tape cassette TTC hardly reaches the light reception portion 112b by the refraction or reflection of the prism portions 123 and 124 and it is possible to prevent a cassette detection error in the tape cassette TTC with the high transparency cassette case 120.

While the prism portion 123 on the side surface portion 120c is formed to have a vertical angle of 30 degrees and the prism portion 124 on the back surface portion 120e is formed to have a vertical angle of 60 degrees in the fourteenth embodiment, the prism portions 123 and 124 may be formed so as to refract or reflect incident light in the emission direction in which the light does not reach the light reception portions 112b.

Figure 32:
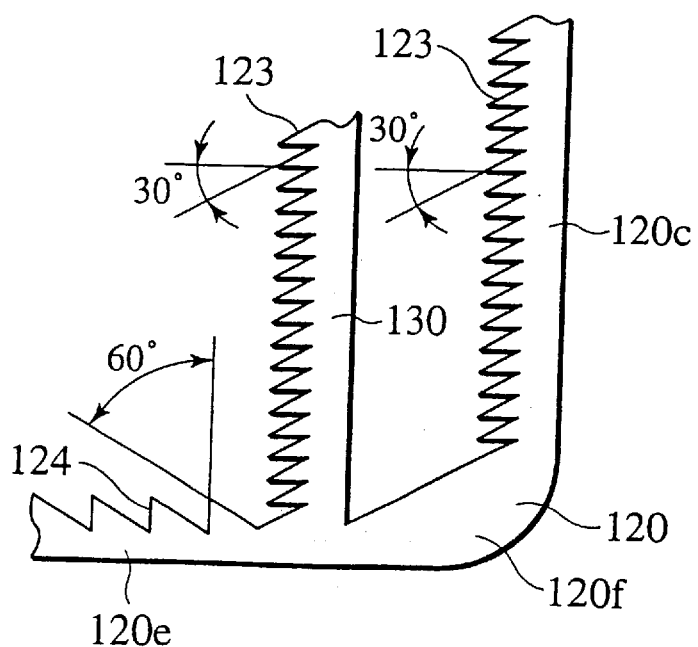
FIG. 32 shows the fifteenth embodiment of the present invention and shows prism portions arranged in part MM of FIG. 28A in partial enlargement view.

FIG. 32, which shows the fifteenth embodiment according to the present invention, shows prism portions arranged on part MM of FIG. 28A in a partially enlarged view. In the fifteenth embodiment, an inner wall 130 parallel to the side surface portion 120c is formed inside the cassette case 120 in addition to the prism portion 123 on the side surface portion 120c and the prism portion 124 on the back surface portion 120e of the fourteenth embodiment. A prism portion 123 is formed on one surface of the inner wall 130 to have the same vertical angle of 30 degrees as that of the prism portion 123 on the side surface portion 120c. The remaining constitution is the same as that of the fourteenth embodiment. The inner wall 130 is formed to reach a partition inner wall 122. With the inner wall 130, incident light leaked in the corner (in the form of R) 120f in which the side surface portion 120c and the back surface portion 120e cross each other, can be refracted, among the light from the side surface portion 112a, in an emission direction in which the light does not reach the light reception portion 112b. Accordingly, it is possible to prevent a cassette detection error in the tape cassette TTC with the high transparency cassette case 120.

Figure 34:
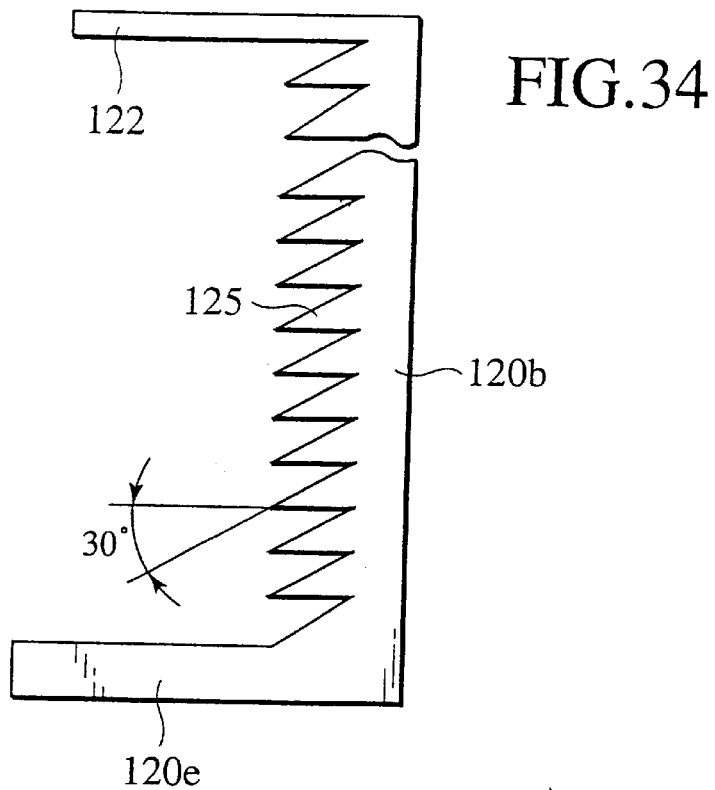
FIG. 34 shows the sixteenth embodiment of the present invention and is a partial enlargement view of part NN of FIG. 33C.
Figure 35:
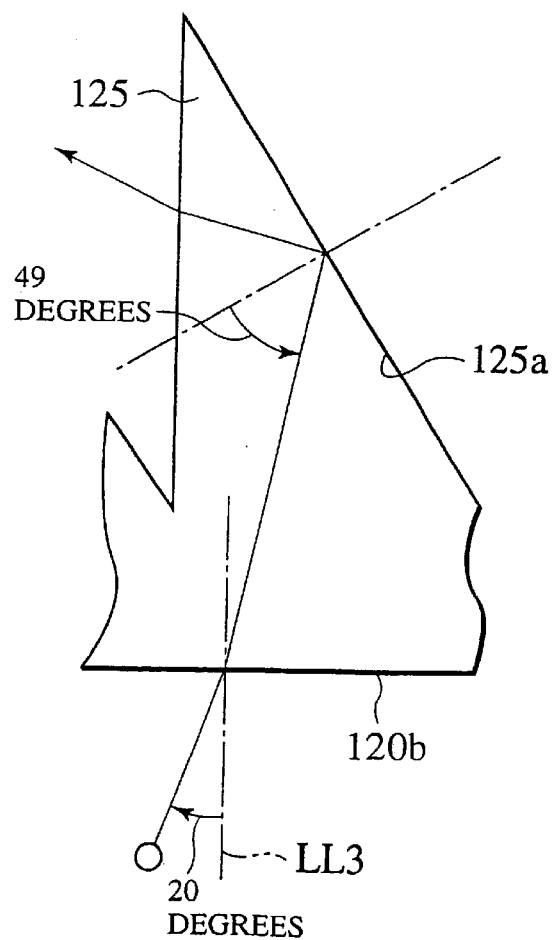
FIG. 35 show the sixteenth embodiment of the present invention and show the optical path of detection light incident on the prism portion on the bottom portion.

FIGS. 33 to 35 show the sixteenth embodiment according to the present invention. Specifically, FIG. 33A is a plan view of a tape cassette from which only the upper surface portion of a cassette case is removed; FIG. 33B is a back view of the cassette case; FIG. 33C is a side view of the cassette case; FIG. 34 is a partially enlarged view of part NN of FIG. 33C; and FIG. 35 shows the optical path of detection light incident on a prism portion on the bottom surface.

With reference to FIGS. 33A to 33C, description will be given first to cassette presence detection means 113 at the side of an apparatus in which the tape cassette TTC in the sixteenth embodiment is used. The cassette presence detection means 113 has a light emission portion 113a provided at the apparatus side and a light reception portion 113b for receiving detection light from the light emission portion 113a. The cassette presence detection means 113 is set so that the optical path CC2 (the center of which is shown therein) of the detection light reaching the light reception portion 113b from the light emission portion 113a may pass a cassette position by going from the bottom side of the tape cassette TTC through the upper surface side thereof. Actually, the detection light is emitted from the light emission portion 113a at an emission angle of about 30 degrees (15 degrees at one side).

Meanwhile, the cassette case 120 of the tape cassette TTC has a generally flat, rectangular parallelopiped shape consisting of an upper surface portion 120a, a bottom portion 120b, a pair of right and left side surface portions 120c, 120c, a front surface portion 120d and a back surface portion 120e and formed out of a high transparency material (e.g., polystyrene). A partition inner wall 122 forming a pair of tape containers 112 is provided inside the cassette case 120. A pair of wound tapes (not shown) are rotatably contained in the paired tape containers 121, 121, respectively.

A prism portion 125 is provided on a portion of the cassette case 120 which portion corresponds to that on the optical path CC2 of the detection light and on which the detection light emitted from the light emission portion 113a is incident first, to be specific, on part of the bottom portion 120b (an area in which the prism portion 125 is provided is indicated by hatching to clarify the position thereof in FIG. 33A).

As shown in FIG. 34, the prism portion 125 is formed continuously in parallel and formed simultaneously with the formation of the cassette case 120 in an integrally fashion. The prism portion 125 on the bottom portion 120b is formed to have a vertical angle of 30 degrees.

With the above-stated constitution, if the tape cassette TTC is put at the cassette position of the apparatus, the detection light from the light emission portion. 113a is applied thereto about the optical path CC2. As shown in FIG. 35, this detection light is incident on the bottom portion 120b of the tape cassette TTC at the center of an incident angle of almost 20 degrees (an angle with respect to an incident normal LL3) and emitted at an emission angle of 49 degrees with respect to the emission surface 125a of the prism portion 125. Since the critical angle of the prism portion 125 is almost 40 degrees, the detection light is, therefore, totally reflected. Accordingly, the detection light is emitted in a direction largely deviated from the optical path CC2 of the incidence light. As can be seen from the above, the detection light applied to the tape cassette TTC hardly reaches the light reception portion 113b by the reflection of the prism portion 125 and it is possible to prevent a cassette detection error in the tape cassette TTC with the high transparency cassette case 120.

While the prism portion 125 on the bottom portion 120b is formed to have a vertical angle of 30 degrees in the sixteenth embodiment, the prism portion 125 may be formed so as to refract or reflect incident light in the emission direction in which the light does not reach the light reception portions 112b.

FIGS. 36A to 36C show the seventeenth embodiment according to the present invention. Specifically, FIG. 36A is a plan view of a tape cassette from which only the upper surface portion of a cassette case is removed; FIG. 36B is a back view of the tape cassette; and FIG. 36C is a side view of the tape cassette.

In FIGS. 36A to 36C, the tape cassette TTC is constituted to be applicable to both the apparatuses in the fourteenth (fifteenth) and sixteenth embodiments. Namely, prism portions 123, 124 and 125 are provided on portions of the cassette case 120 corresponding to those on the two optical paths CC1 and CC2 of the detection light (the side surface portion 120c of the cassette case 120 and part of the back surface portion 120e adjacent the side surface portion 120c as described in the fourteenth and fifteenth embodiments and part of the bottom portion 120b as described in the sixteenth embodiment), respectively (FIG. 36A shows an area in which the prism portions 123, 124 and 125 are provided is indicated by hatching to clarify the positions thereof). The constitutions of the respective prism portions 123, 124 and 125 are the same as those described in the fourteenth (or fifteenth) embodiment and the sixteenth embodiment, which description will not be given herein to avoid repetitive description.

In the tape cassette TTC in the seventeenth embodiment, even if it is used in either the apparatus in the fourteenth (or fifteenth) embodiment or that in the sixteenth embodiment, detection light applied to the tape cassette TTC hardly reaches the light reception portions 112b and 113b by either the refraction or reflection of the prism portions 123, 124 and 125. It is, therefore, possible to prevent a cassette detection error in the tape cassette TTC with the high transparency cassette case 120.

In the above-stated fourteenth to seventeenth embodiments, since the prism portions 123, 124 and 125 are formed integrally with the cassette case 120 and they are formed simultaneously with the cassette case 120, the production of the prism portions 123, 124 and 125 is easy and production cost can be reduced. Alternatively, the prism portions 123, 124 and 125 may be produced separately from the cassette case 120 and then attached to the cassette case.

In the above-stated fourteenth, fifteenth and seventeenth embodiments, since the prism portion 123 is provided on the portion of the cassette case 120 on which portion detection light emitted from the light emission portion 112a is first incident, the distance from the prism portion 123 to the light reception portion 112b is long. Thus, it is possible to prevent the detection light from reaching the light reception portion 112b even if the deviation angle of the prism portion 123 is set small, whereby the degree of freedom for the design of the prism portion 123 increases. Alternatively, the prism portion may be provided on the portion of the cassette case 120 on which the detection light emitted from the light emission portion 112a is incident not first but second, to be specific, on the front surface portion 120d.

In the above-stated fourteenth to seventeenth embodiments, since the prism portions 123, 124 and 125 are provided on the inner surface of the cassette case 120, there is little possibility that the surfaces of the prism portions 123, 124 and 125 are damaged or the like by friction, scratch or the like.

In the meantime, light shielding members may be provided at the positions of the prism portions 123, 124 and 125 so as to obtain the same advantages as those of the present invention. However, if the prism portions 123, 124 and 125 are formed integrally with the cassette case 120, an assembly step is not necessary compared with a case where the light shielding members are provided. Thus, this embodiment is advantageous in that problems such as attachment error and peeling do not occur and also excellent in design.

The above-stated fourteenth to seventeenth embodiments illustrate an example of the tape cassette TTC which can be applied to a case where the optical path CC1 of the detection light passes the cassette position by going from the side surface side of the tape cassette TTC through the front surface side thereof and to a case where the optical path CC2 of the detection light passes the cassette position by going from the bottom side of the tape cassette TTC through the upper surface side thereof. It goes without saying that the present invention is also applicable to cases of optical paths other than CC1 and CC2.

In the above-stated fourteenth to seventeenth embodiments, the prism portions 123, 124 and 125 are provided only on the portions of the cassette case 120 corresponding to those on the optical paths CC1 and CC2. If similar prism portions 123, 124 and 125 are provided symmetrically about a vertical axis, the design of the resultant tape cassette becomes more excellent and the degree of freedom for the design of the cassette presence detection means 112 and 113 increases accordingly.

Figure 37:
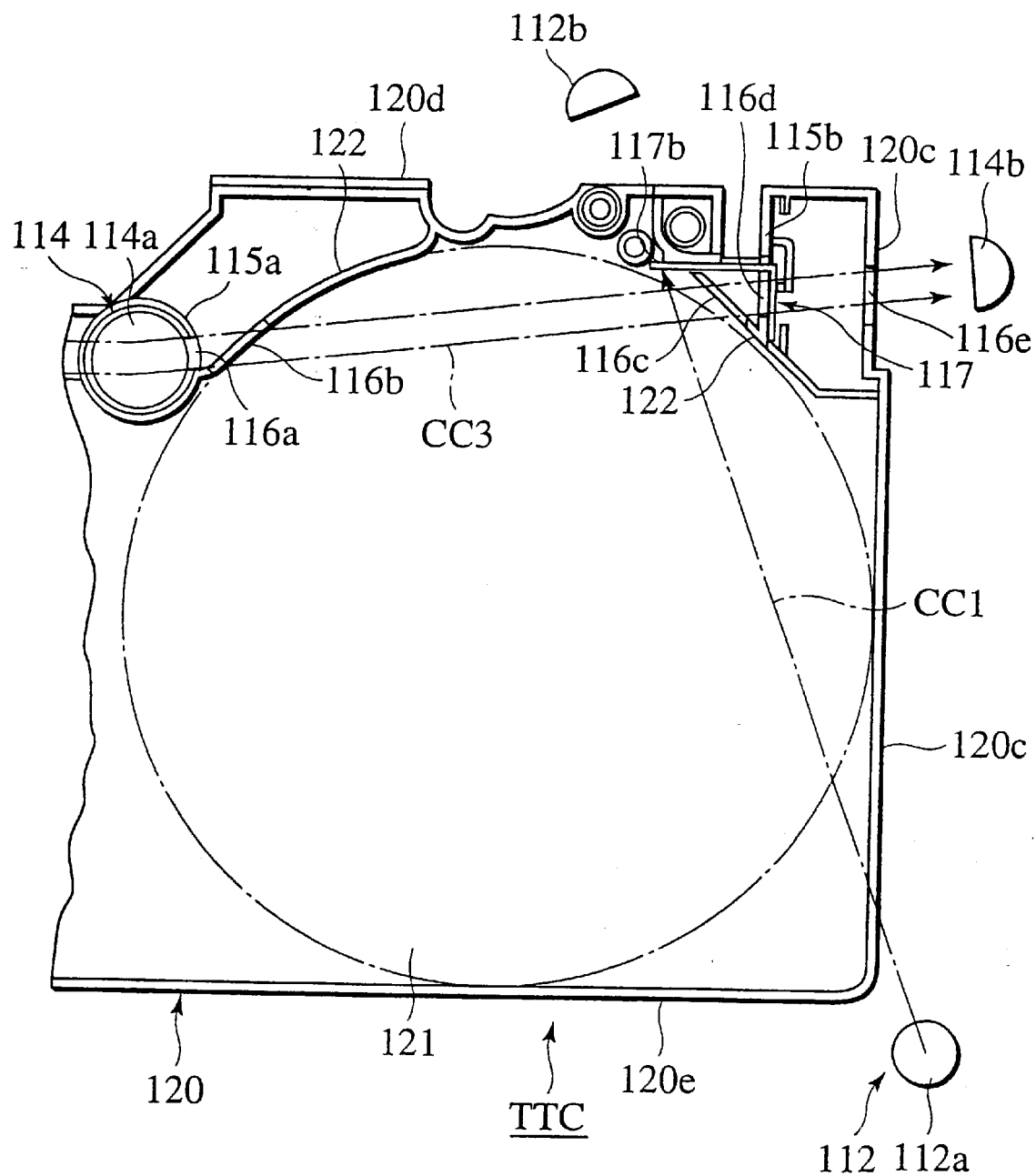
FIG. 37 shows the eighteenth embodiment of the present invention and a partial plan view of a tape cassette from which only the upper surface portion of a cassette case is removed.
Figure 38:
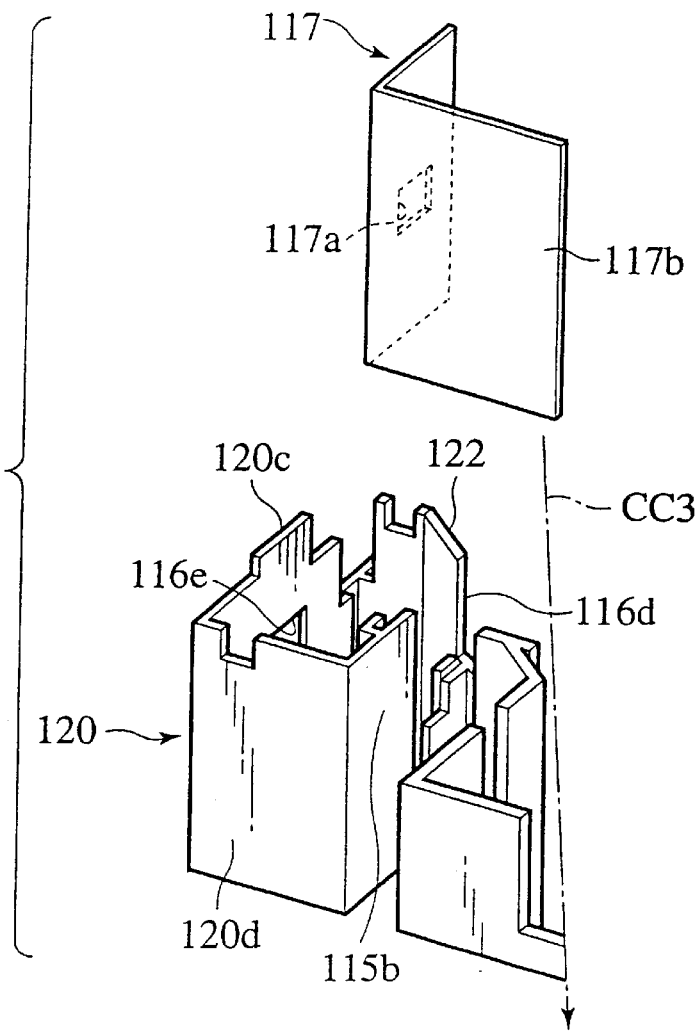
FIG. 38 shows the eighteenth embodiment of the present invention and is a perspective view of important parts showing a state before the light shielding member is attached.
Figure 39:
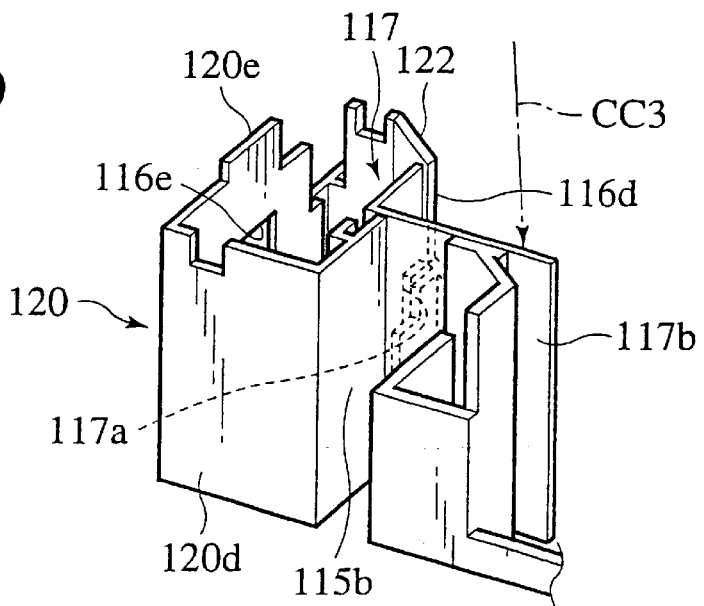
FIG. 39 shows the eighteenth embodiment of the present invention and is a perspective view of important parts showing a state the light shielding member has been attached.

FIGS. 37 to 39 show the eighteenth embodiment according to the present invention. Specifically, FIG. 37 is a partially plan view of a tape cassette TTC from which the upper surface side of a cassette case 120 is removed; FIG. 38 is a perspective view of the important parts of the tape cassette showing a state before a light shielding member 117 is attached; and FIG. 39 is a perspective view of the important parts thereof showing a state that the light shielding member 117 has been attached.

In FIG. 37, cassette presence detection means 112 at the side of an apparatus in which the tape cassette TTC in the eighteenth embodiment is used is the same as that in the fourteenth (or fifteenth) embodiment. Therefore, the means 112 is denoted by the same reference symbol as that in the fourteenth (or fifteenth) embodiment and no description will be given thereto. Further, tape end detection means 114 is provided at the apparatus side. The tape end detection means 114 is provided with a light emission portion 114a and a pair of tape end detection light reception portions (one of which is not shown therein) for receiving detection light from the light emission portion 114a. While the tape cassette TTC is being attached to the apparatus, the light emission portion 114a is arranged in a wall portion 115a having a cylindrical center and the paired light reception portions 114b are arranged at external positions on the right and left sides of the tape cassette TTC, respectively.

The cassette case 120 of the tape cassette TTC is constituted in the same manner as that in the fourteenth embodiment and formed out of a high transparency material. The wall portion 115a, a partition inner wall 122, a wall portion 115b and a side surface portion 120c on the tape end detection optical path CC3 coupling the light emission portion 114 with the light reception portion 114b of the tape end detection means 114 are provided with optical passages 116a to 116e, respectively. A light shielding member 117 is attached to the portion of the light passage 116d of the wall portion 115b. A light passage 117a is opened on the portion of the light shielding member 117 which portion contact with the optical path CC3. The light passage 117a is constituted to pass detection light passing on the optical path CC3 and to prevent the passage of unnecessary light deviated from the optical path CC3. That is, with this constitution, even if the cassette case 120 is formed out of a high transparency material, it is possible to ensure preventing erroneous detection of a tape end.

Furthermore, one end of the light shielding member 117 is formed large and extended to exceed the degree to which the portion of the light passage 116d on the wall portion 115b is blocked. This extended portion 117b is clinched with respect to the portion on which the light passage 117a is provided and arranged on the cassette presence detection optical path CC1.

In this eighteenth embodiment, only the light passing through the optical path CC3, among the detection light for the detection of a tape end, passes through the light passage 117a of the light shielding member 117 and the passage of light deviated from the optical path CC3 is prevented by the light shielding member 117. Owing to this, if the cassette case is made of a high transparency material, it is possible to ensure preventing the erroneous detection of a tape end. In addition, the passage of the cassette presence detection light is prevented by the extended portion 117b of the light shielding member 117. Owing to this, if the cassette case is made of a high transparency material, it is possible to ensure preventing the erroneous detection of the presence of a cassette. Further, in case of preventing the erroneous detection of the presence of a cassette, the light shielding member 117 for preventing the erroneous detection of a tape end is utilized. Due to this, it is possible to prevent the erroneous detection of the presence of a cassette without increasing the number of parts and without deteriorating assemblage.

Figure 40:
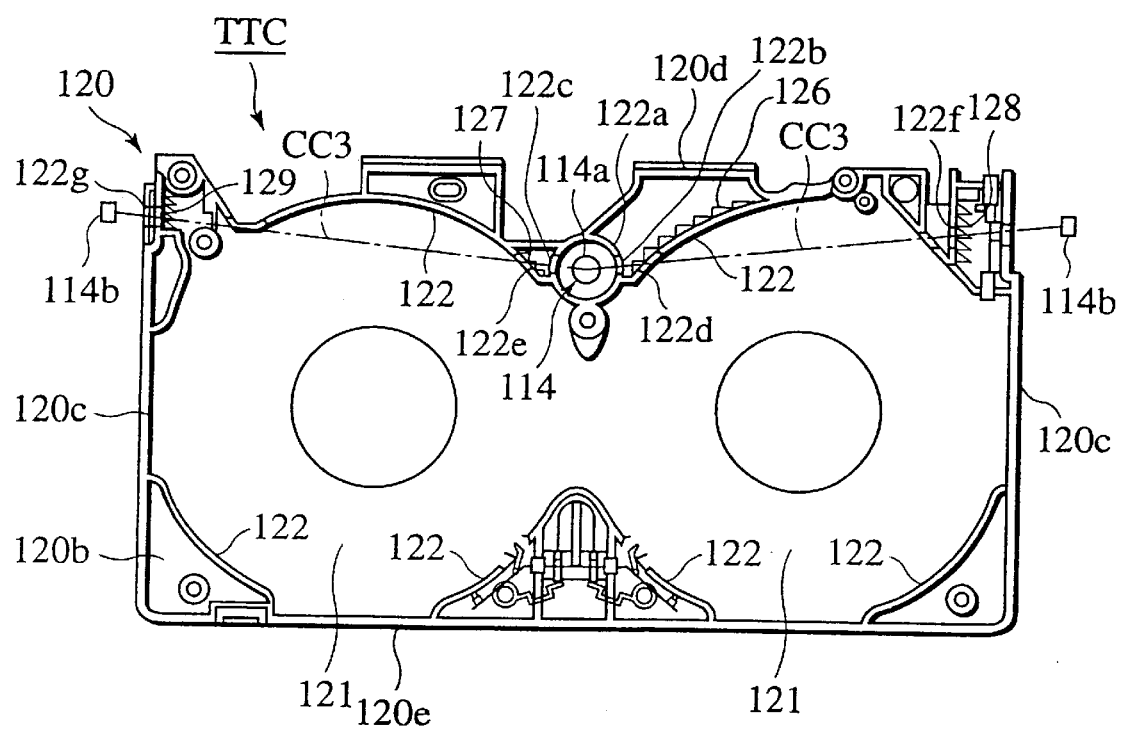
FIG. 40 shows the nineteenth embodiment of the present invention and a plan view of a tape cassette from which only the upper surface portion of a cassette case is removed.
Figure 41A:
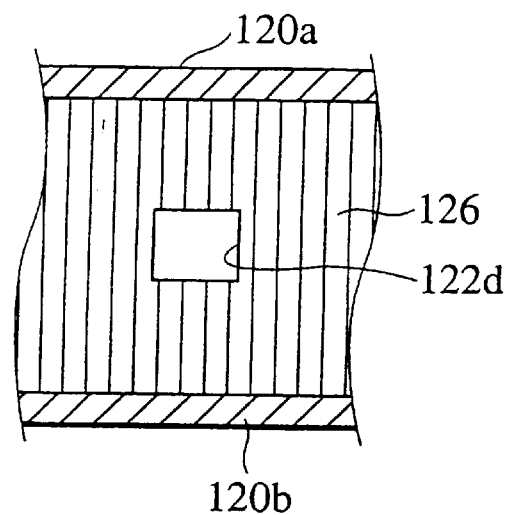
Figure 41B:
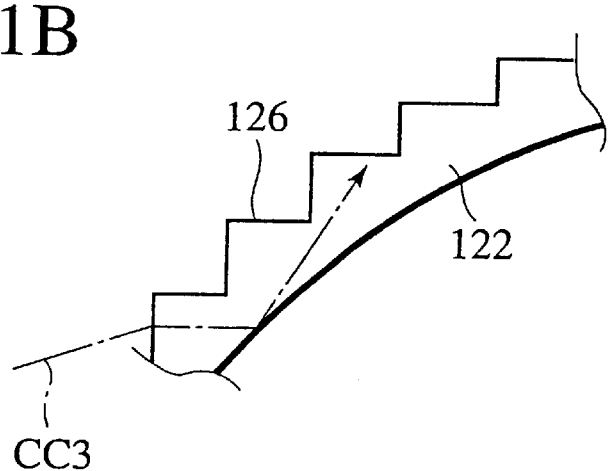
Figure 41C:
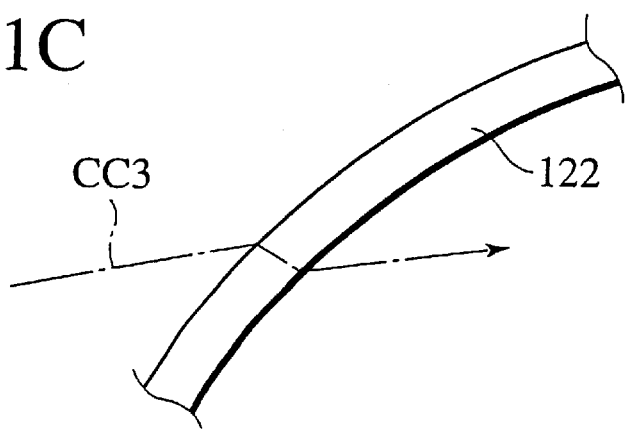

FIG. 40, which shows the nineteenth embodiment according to the present invention, is a plan view of a tape cassette from which only the upper surface portion of a cassette case is removed. FIG. 41A is an explanatory view of the tape cassette for the surrounding of an optical path notch of the cassette case. FIG. 41B shows the optical path of tape end detection light while a prism portion is provided. FIG. 41C shows the optical path of tape end detection light while a prism portion is not provided.

The nineteenth embodiment is intended to prevent a tape end detection error (tape terminal end detection error) in a tape cassette TTC in which tape end detection light CC3 passes through portions other than optical path notches of a high transparency cassette case 120 in a system in which high transparency leader tapes are provided on the both ends of a magnetic tape and a tape terminal end is detected while using tape end detection light (tape terminal end detection light) CC3 from the light emission portion 114a of tape end detection means 114. That is, optical path notches 122d and 122e are formed in right and left partition walls 122, 122 around tape end detection notches 122b and 122c on the both sides of a right semicylindrical wall 122a constituting the insertion hole of the light emission portion 114a for the detection of a tape end, respectively. Prism portions 126 and 127 for refracting or reflecting the tape end detection light CC3 from the light emission portion 114a in a direction in which the light does not reach the right and left light reception portions 114b, 114b, are provided on the partition walls 122 around the notches 122d and 122e, respectively.

Further, prism portions 128 and 129 for refracting or reflecting the tape end detection light CC3 from the light emission portion 114a in a direction in which the light does not reach the right and left light reception portions 114b, 114b, are provided on walls around optical path notches 122f and 122g at the front sides of the right and left side surface portions 120c of the cassette case 120, respectively. The remaining constituent elements are the same as those in the fourteenth embodiment. Accordingly, the same constituent elements are denoted by the same reference symbols and detailed description will not be given thereto.

According to the tape cassette TTC in the nineteenth embodiment, the tape end detection light CC3 hardly reaches the right and left light reception portions 114b, 114b by the refraction or reflection of the respective prism portions 126 to 129, thereby making it possible to prevent a tape end detection error in the tape cassette TTC with the high transparency cassette case 120.

As shown in FIGS. 41A and 41B, if the prism portion 126 is provided around the notch 112d through which the tape end detection light CC3 passes, the light from the light emission portion 114a does not advance straight as shown in FIG. 41B and is refracted or reflected in a direction in which the light does not reach the light reception portion 114b. In theory, the prism portion may be formed on one surface. However, if the angle of the incident light on the prism portion is small and the prism portion is formed integrally with the cassette case 120, the advancing components of the light are left due to the curved portion (R portion) provided at the peak or in the corner of the prism portion and surface property thereof and they reach the light reception portions to thereby cause malfunction. In view of this, therefore, if the prism portions 126 to 129 are provided on a plurality of portions of the partition inner wall 122 as shown in FIG. 40, the prevention of malfunction is more ensured.

Needless to say, in case of detecting a tape end and detecting whether or not a tape cassette is present, the first to nineteenth embodiments described so far can be arbitrarily selected and combined.

It should be understood that many modifications and adaptations of the invention will become apparent to those skilled in the art and it is intended to encompass such obvious modifications and changes in the scope of the claims appended hereto.

What is claimed is:

1. A tape cassette comprising:

a cassette case having a top face portion, an under face portion, a front face portion, a rear face portion, and a pair of side face portions of right and left sides;

a pair of tape containers of supply and take-up sides provided in said cassette case;

a tape wound around a pair of reels and contained in the pair of tape containers;

a first wall portion connecting the rear face portion and the right side face portion with each other and forming part of the take-up side tape container;

a second wall portion connecting the rear face portion and the left side face portion with each other and forming part of the supply side tape container; and a first prism portion extending from at least a part of the rear face portion to at least a part of the right side face portion and refracting or reflecting light from a light emission element of the recording and reproducing apparatus for detecting presence and absence of said tape cassette to prevent the light from reaching a light reception element of the recording and reproducing apparatus.

2. A tape cassette according to claim 1, if wherein said first prism portion and said cassette case are integrally formed.

3. A tape cassette according to claim 1, further comprising a third wall portion connecting the rear face portion and the first wall portion with each other and having a second prism portion refracting or reflecting the light from the light emission element of the recording and reproducing apparatus for detecting presence and absence of said tape cassette to prevent the light from reaching a second light reception element of the recording and reproducing apparatus.

4. A tape cassette according to claim 3, wherein said second prism portion and said cassette case are integrally formed.

5. A tape cassette comprising:
- a cassette case having a top face portion, an under face portion, a front face portion, a rear face portion, and a pair of side face portions of right and left sides;
- a pair of tape containers of supply and take-up sides provided in said cassette case;
- a tape wound around a pair of reels and contained in the pair of tape containers;
- a first wall portion connecting the rear face portion and the right side face portion with each other and forming part of the take-up side tape container;
- a second wall portion connecting the rear face portion and the left side face portion with each other and forming part of the supply side tape container; and
- a prism portion provided on at least a part of a region of the under face portion and refracting or reflecting light from a light emission element of the recording and reproducing apparatus for detecting presence and absence of said tape cassette to prevent the light from reaching a light reception element of the recording and reproducing apparatus, said region being enclosed by the rear face portion, the left side face portion and said second wall portion.

6. A tape cassette according to claim 5, wherein said prism portion and said cassette case are integrally formed.

* * * * *